(12) United States Patent
Lykes et al.

(10) Patent No.: US 11,671,644 B2
(45) Date of Patent: Jun. 6, 2023

(54) TARGETED PREEMPTION FOR DIGITAL AD INSERTION

(71) Applicant: Viamedia, Inc., Lexington, KY (US)

(72) Inventors: Randy Lykes, Lexington, KY (US);
Wendell Decker, Lexington, KY (US);
James T O'Neill, Bedford, KY (US);
Adam Lynch, Lexington, KY (US);
Paul Cavins, Newburg, IN (US)

(73) Assignee: Viamedia, Inc., Lexington, KY (US)

( * ) Notice: Subject to any disclaimer, the term of this patent is extended or adjusted under 35 U.S.C. 154(b) by 0 days.

(21) Appl. No.: 17/368,760

(22) Filed: Jul. 6, 2021

(65) Prior Publication Data
US 2021/0337254 A1 Oct. 28, 2021

Related U.S. Application Data

(63) Continuation-in-part of application No. 16/989,581, filed on Aug. 10, 2020, now Pat. No. 11,405,697, which is a continuation-in-part of application No. 16/577,858, filed on Sep. 20, 2019, now Pat. No. 11,057,134, which is a continuation-in-part of application No. 16/227,160, filed on Dec. 20, 2018, now Pat. No. 10,757,462.

(51) Int. Cl.
| | |
|---|---|
| *H04N 21/2668* | (2011.01) |
| *H04N 21/262* | (2011.01) |
| *H04N 21/435* | (2011.01) |
| *H04N 21/458* | (2011.01) |
| *H04N 21/81* | (2011.01) |

(52) U.S. Cl.
CPC ........... *H04N 21/2668* (2013.01); *H04N 21/26208* (2013.01); *H04N 21/435* (2013.01); *H04N 21/458* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 2009/0094631 A1* | 4/2009 | Whymark | H04N 21/812 725/22 |
| 2013/0247095 A1 | 9/2013 | Weihs et al. | |
| 2016/0345074 A1 | 11/2016 | Serbest et al. | |
| 2019/0122659 A1* | 4/2019 | Miller | H04N 21/458 |
| 2019/0266632 A1 | 8/2019 | Milford et al. | |
| 2019/0387262 A1 | 12/2019 | Link | |
| 2020/0059693 A1 | 2/2020 | Neumeier et al. | |

OTHER PUBLICATIONS

International Search Report and Written Opinion from International Patent Application No. PCT/US21/35413, dated Aug. 31, 2021.

* cited by examiner

*Primary Examiner* — Omar S Parra
(74) *Attorney, Agent, or Firm* — Dergosits & Noah LLP

(57) ABSTRACT

A programmable and universal video platform enabling digital ads from ad sales teams, online digital exchanges, demand side platforms or other digital video advertising aggregators, to be inserted into linear television cable programming feeds.

12 Claims, 20 Drawing Sheets

CCMS Schedule: Data Record format 

| Field | Name | Bytes |
|---|---|---|
| 1 | Event type | 1-3 |
| 2 | Scheduled date | 5-8 |
| 3 | Scheduled time | 10-15 |
| 4 | Window start time | 17-20 |
| 5 | Window duration | 22-25 |
| 6 | Break number in window | 27-29 |
| 7 | Position number within break | 30-33 |
| 8 | Scheduled length | 35-40 |
| 9 | Actual aired time | 42-47 |
| 10 | Actual aired length | 49-56 |
| 11 | Actual aired position with break | 58-60 |
| 12 | Spot identification | 62-72 |
| 13 | Status code | 74-77 |
| 14 | Advertiser name | 79-110 |
| 15 | Advertiser spot name | 112-131 |
| 16 | Scheduled/fill | 133-136 |
| 17 | Reserved – traffic | 138-143 |
| 18 | User defined | 145-NNN |

FIG. 15

TARGETED PREEMPTION FOR DIGITAL AD INSERTION

TECHNICAL FIELD

This disclosure relates in general to advertising for linear and digital video programming, and more particularly, to the targeting of digital advertising content into linear and digital video programming streams.

BACKGROUND

A significant portion of television viewing is linear programming on cable networks (e.g., ESPN, TNT, CNBC). These networks are carried by multichannel video programming distributors ("MVPDs"), which are services that provide multiple television channels to customers through a set top box ("STB") installed at the subscriber's location. Examples of MVPDs include Charter, Comcast, Altice, Cox and others. Linear programming consists of a continuous audio/video feed for the duration of a cable network program or program segment.

The cable networks identify within each linear programming stream available time slots ("avails") for insertion of advertising content ("ads") locally by an MVPD. In a typical scenario, approximately 15 minutes per hour of advertising are filled from national advertising campaigns which run throughout the entire country on that cable network. Another 2-3 minutes per hour are filled with local advertising content, either by splicing the ad content into the programming stream or by stopping and starting the programming stream allowing for local ad insertion gear to fill the time with commercials.

Traditionally, linear ad insertion platforms do not communicate with digital advertising platforms. The standards for communication are distinct to each and do not cross connect. Traditional ad insertion utilizes fixed schedules by network and local avail opportunity for ad playout. Traditional linear ad insertion platforms do not reference or track performance based on impressions sought or delivered nor do they provide any additional dynamic targeting parameters (traditional platforms may provide sub-zone capabilities for hard-wired sub designated market area ("DMA") targeting ability). Typically, 80% of all revenues run on the "top" 20 to 25 cable networks. However, when overnight inventory is accounted for, the sell-thru percentage on the top 20 to 25 cable networks is significantly reduced, meaning that there is a substantial amount of "unsold" avails and substantial incremental opportunities for targeted audience-centric marketing.

Thus, the growth of traditional cable television advertising has been flat as advertisers have moved their resources to take advantage of the growing consumer demand for digital media, along with the ease of placing digital ads on websites through digital ad exchanges and through programmatic platforms onto desktops, laptops, and mobile devices. Almost any digital ad server can place an ad on any platform based on data to target the right consumer. In addition, digital technology enables the ability to use data to hyper target the right audience in filling advertising avails. This ability to hyper-target the right "audience" on any digital media property without a preset schedule and only paying for the actual impressions or impression counts, which are accurate to industry standard acceptance, and thus maximizing ad spending, is why digital advertising revenues have grown exponentially, along with the increase in digital video consumption.

For television advertising placement to work as effectively and efficiently, the MVPDs and their advertising partners must address legacy standards and technology.

The Society of Cable Telecommunications Engineers ("SCTE") has promulgated a relevant standard, SCTE 35, for defining a "cue message" to specify how to fill the avails in the programming television stream, entitled Digital Program Insertion Cueing Message for Cable (2016). SCTE 35 is the core signaling standard for advertising and distribution control of content for content providers and content distributors, and thus, SCTE 35 cueing signals are incorporated into the programming feed and used to identify advertising breaks and programming content. In addition, virtually all content providers regularly publish their programming schedules, and more importantly for advertising purposes, the commercial break structures for programs, which may be used to create corresponding linear television schedules.

For online digital advertising, the Interactive Advertising Bureau has set a standard specification for communications between digital ad servers and digital video players called the Video Ad Serving Template ("VAST"). Thus, digital ads served according to the VAST protocol can be played by any digital video player.

However, since MVPDs may utilize different platforms of hardware and software for distribution of the program content, in general they do not utilize the infrastructure required for generating or processing VAST ad calls. In that case, a VAST tag must be specially configured and integrated in the ad insertion infrastructure to allow distribution on a particular distribution platform. The differences in distribution platforms, evidenced by use of different operating systems and set top boxes, presents a measure of difficulty for inserting ads for different MVPDs. Therefore, it would be desirable for an online digital ad serving network to be able to use standard digital ad insertion workflows to access the MVPD's television inventory. Having the capability to serve ads universally onto a variety of different television distribution platforms would enable digital ad serving exchanges to be applied to the ad avails in linear programming of cable TV networks, as well as to over-the-top ("OTT") platforms such as Hulu, Netflix and SlingTV, and privately-managed IPTV networks, without having a preset schedule of breaks. This would enable more avails in linear TV programming to be bought, sold, and measured, and combined with the ability of data processing to utilize audiences as the target and ad impressions as the currency, such an improvement would effectively integrate the linear and digital video advertising ecosystems. This capability would also increase the potential revenues for addressable advertising, namely, sending an individual ad to an individual set top box based on audience targeting data. In addition, a time-based solution can also be implemented to enable legacy equipment to utilize universal ad serving.

BRIEF DESCRIPTION OF THE DRAWINGS

FIG. 15 is a table illustrating the fields in a data record of a programming schedule file.

DETAILED DESCRIPTION

Figure 1:
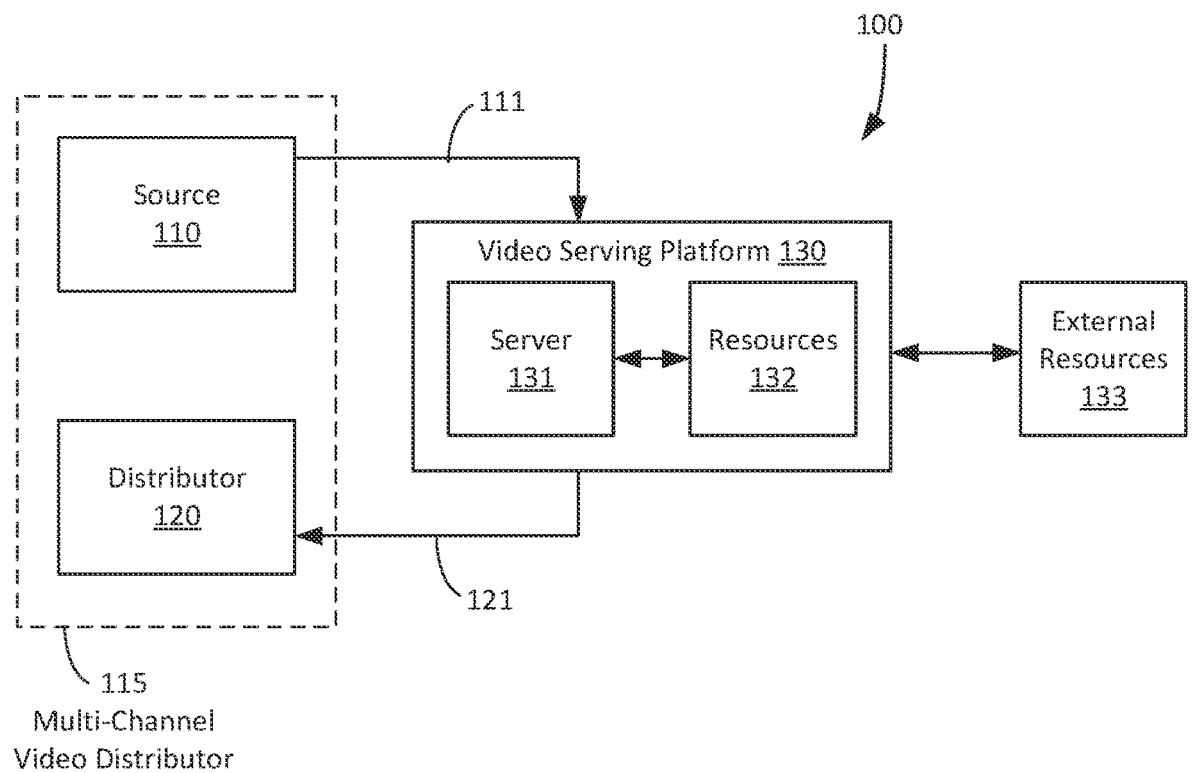
FIG. 1 is a block diagram illustrating a first embodiment of a system for inserting ad content into a linear programming stream.

FIG. 1 illustrates a simple schematic representation of a system 100 for inserting digital video advertisements ("ads") into available spots ("avails") that are designated for content insertion in a linear cable television programming stream. A linear programming stream is one that is continuously broadcast from start to finish of the program, such as regular episodes of a television series or a news broadcast, or a live event such as a sports broadcast. Many if not most avails in linear programming or high-profile linear programming (such as sports events or special events) are filled by national advertising campaigns, but typically avails are made available for local cable providers to insert local advertising at their head end.

The linear programming stream 111 originates from a source receiver or server 110, typically a multi-channel video programming distributor ("MVPD"), and is provided as an input to a video serving platform 130. The video serving platform 130 detects a message, called a "cue" herein, that is embedded within the linear programming stream 111 and which identifies a local ad insertion break that is coming up in the linear programming stream. In some embodiments, the cue may be called a cue message, or a cue tone, or a tag, but in any event the cue is an indicator that signals to video distributors, such as cable television head-ends, that an avail is coming, and providing details of the avail.

Upon detecting the message identifying an avail, the video serving platform 130 requests encoded (CALM compliant) digital video content to insert into the avail. The request includes the location of the avail in the programming stream, usually the time that the avail will start and end, or the start time and the duration. In one embodiment, the video serving platform 130 includes a first video server 131 that includes a configuration as an ad splicer to insert or splice the digital content into the linear programming stream 111 at the designated avail, as well as internal resources 132, such as one or more additional servers, configured to store digital content, to serve digital content, and to make decisions about appropriate digital content to insert into avails.

There may also be external resources 133 to provide various of these functions. For example, an estimate regarding the number of televisions tuned to a particular program or channel during the ad presentation is useful and desirable as a criteria for selecting the appropriate digital ad content to insert into the avail, and such viewer information may be provided by a third-party audience measurement service or via the MVPD's own media management platform including the MVPD's aggregation of tuning (viewing) information from set top boxes or servers in its distribution network. Advantageously, actual viewing information is available after the ad has been inserted, and the third-party service or the MVPD media management platform can provide information that confirms an actual count of impressions served for a particular ad insert for billing purposes. As another example, the ad decisioning network may be external to the video serving platform 130.

The result of seamlessly generating a VAST request for digital content from a linear programming stream is that online digital ad servers, such as Google Ad Manager, Freewheel, Cadent/Blackarrow, Atlas (Amazon), Appnexus, OpenX and others, can now serve a digital ad into traditional TV distribution platforms without replacing set top boxes or adding firmware.

It is noted that the term "video serving platform" is used in the embodiment of FIG. 1 and is intended to define an integrated platform, comprised of multiple components including a video server and/or an ad splicer, that can perform all the steps required for ad insertion within the integrated video serving platform, including detection of a cue message in the linear programming stream, the generation of an ad request for digital content incorporating information from the cue, the preparation of a VAST response to the ad request, and the serving of digital content identified in the response into the linear programming feed. However, the term "video server" is also used in this description and could be used interchangeably with video serving platform, but more typically will describe a server with less than all of the ad serving features integrated into a single device or related group of devices, but acts as the controller or manager of ad insertion operations. The term "ad splicer" is also used and also refers to a server, but more typically will have and provide more limited features than a video server or a video serving platform.

Figure 2:
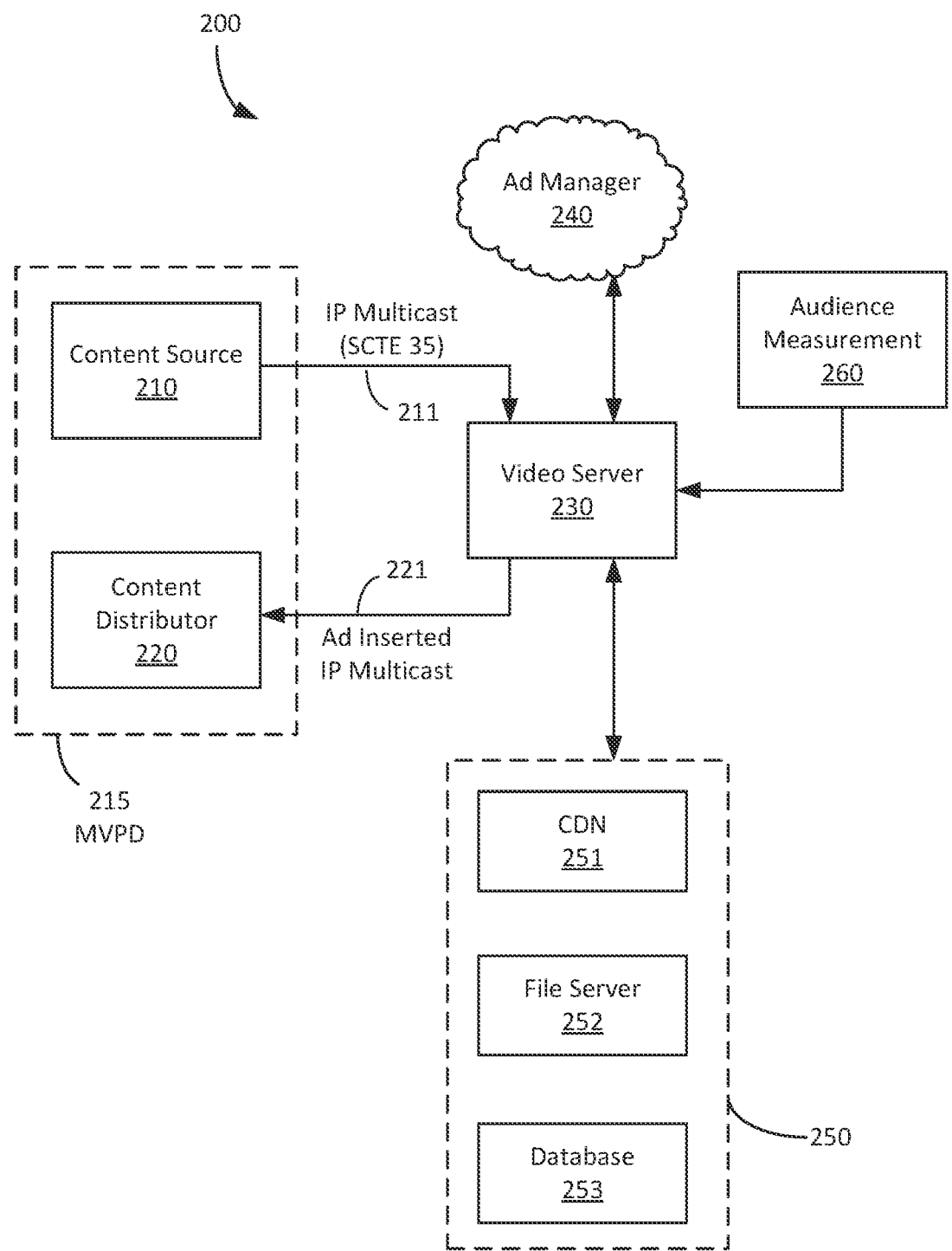
FIG. 2 is a block diagram illustrating a second embodiment of a system for inserting ad content into a linear programming stream.

Referring now to FIG. 2, a more detailed embodiment of a digital ad insertion system 200 is illustrated. In this system 200, a content source 210 provides one or more linear programming streams 211, which in one embodiment are IP multicasts formatted in accord with SCTE 35. A content distributor 220 is the destination of the linear programming feed, once it has been modified to include an inserted ad. The content source 210 and the content distributor 220 may be part of the same multi-channel video programming distributor ("MVPD") 215 or they may be separate MVPDs.

Examples of MVPDs can include common subscription television networks available via cable or satellite, such as Comcast, AT&T, Cox, Charter, CenturyLink and others.

Digital ad insertion into the linear programming stream is performed by an ad splicer as part of the video server 230 and decision making for digital ad insertion is performed by an ad manager 240. The video server 230 and the ad manager 240 are typically separate computing units providing multiple functions, but may be integrated together in a single video ad server platform, as illustrated in FIG. 1.

The video server 230 is also in communication with other resources 250, 260 that facilitate decision making with regard to ad targeting and ad selection. For example, the resources 250 can include a content delivery network 251, a file server 252, and a performance database 253, and each of these resource components may be part of an integrated video serving platform with the video server. The content delivery network 251 is dedicated to transmitting requested digital ad content to the video server 230 for insertion into the linear programming stream in accordance with the ad request. The file server 252 stores previously encoded digital ads that are available for selection and insertion as well as post-insertion verification data collected periodically. The database 253 gathers and stores data from all the processes, from which performance reporting and invoicing for executed advertising campaigns can be generated, for example.

All of the components described herein may be implemented using conventional computer-based servers, programmed with instruction sets to realize the various features.

In one embodiment, the video server 230 includes programming features that are useful in constructing an ad request, in particular, by providing data to be used in a configurable data field in the VAST request to pass ad targeting parameters and other important information. Programmable fields in the VAST request may include (i) specification of ad rules, i.e., whether to follow the VAST workflow or a different ad rules workflow; (ii) identifying the content source (like video on demand "VOD"); (iii) listing the specific video identifier (such as a specific VOD asset; for example, someone wants to advertise on all John Wayne movies); (iv) including key-values (such as: daypart ads, DMA, zip code, genre, age, gender, income, etc.); (v) identifying fall-back ad data -if the primary ad is not available, the ADS can send multiple responses based on priority); and (vi) providing instructions to handle any issues that arise under the Children's Online Privacy Protection Act of 1998 ("COPPA"); to name just a few.

Ad splicers and ad insertion servers are generally well known, such as those made by Arris, RGB, Imagine, SeaChange, Culloma Technologies Ltd., Digital Adware, TelVue, and others.

For example, a video player can seamlessly play digital ad content if instructed via a communication layer by a properly constructed VAST response to an ad request. Thus, the process starts with the ad request, which is ultimately triggered by including a "cue" in the linear programming stream, such as a SCTE 35 cue message. However, the ad request may be built ahead of receiving the cue message since many of parameters of interest for ad targeting are known ahead of time from the local schedule files, as described further below, and other relevant information that is known or may be obtained from other sources. The cue signals that an avail is coming up within the linear programming stream, and passes parameters for inserting content into the avail, such as the start and end time, or the start time and the duration. The relevant standard for constructing a cue message for a linear programming stream can be found in SCTE 35 (see https://www.scte.org/SCTEDocs/Standards/SCTE%2035%202017.pdf), incorporated herein by reference.

Once the cue message is detected by the video server 230, the ad request is sent to the ad manager 240 for processing with regard to selection of digital content for insertion. The ad request is constructed as a data packet with a number of required and optional fields for passing parameters to the ad manager, such as program identification, program type, avail start time, and avail stop time, and as noted above, many of these parameters are known prior to receiving the cue message. Therefore, the ad request can be built ahead of time and sent upon receiving the cue message, with or without additional parameters passed via the cue message. In one embodiment, the data packet can be constructed to include one or more configurable data fields that can be filled by the video server 230. For example, the video server or other designated server can obtain estimates related to viewing audience for the avail in terms of number of impressions, demographics, psychographics, consumer purchaser information, etc., from a third-party audience measurement service 260 or from the aggregation of tuning data from an MVPD, and provide those estimates to the ad manager 240 as a key parameter for ad targeting.

Once the ad request is received by the ad manager 240, the ad manager identifies a digital ad that meets the parameters of the request, then prepares a VAST response and sends the response back to the video server 230 for handling the insertion. The relevant standard for constructing a VAST response be found on the Interactive Advertising Bureau website (see https://www.iab.com/guidelines/digital-video-ad-serving-template-vast/), incorporated herein by reference. For instance, the cue message for a specific ad break (time/duration and program) on a specific network (like HGTV) will be read by the video server 230 and passed to ad manager 240. The associated servers 250 will be polled, or previously had been polled, to obtain the associated data included in the VAST request. The video server 230 and/or video server resources 250 also query other databases as appropriate, such as the viewer measurement server 260, to acquire the number of STB's tuned to this network as this time, and other databases as possible and relevant to further define the targets for the break and to complete preparation of the VAST request.

The video server 230 will, as needed, retrieve the identified digital ad from storage and send it to its ad splicer component, which will directly insert the file into the linear programming stream at the designated ad insertion point.

In one embodiment, the ad manager 240 is a local instance of Google Ad Manager, but this decisioning unit could be implemented using technology from Cadent, Freewheel, or other ad decisioning platforms. An example of how to prepare a master video tag with Google Ad Manager for retrieving video ads in provided at the Google Ad Manager Help (see https://support.google.com/admanager/answer/1068325?hl=en). An example of in-stream ad insertion is also described in U.S. Pat. No. 8,738,787 entitled Ad Server Integration, which is incorporated herein in its entirety. Other embodiments can include other digital ad servers.

Data regarding audience measurement of actual viewing and viewer demographics is obtained from a third-party audience measurement service 260 such as Nielsen, Comscore, or other companies that aggregate subscriber tuning (viewing) data, or even the MVPD itself, which may have the ability to aggregate tuning data from its set top boxes or servers. For example, a critical question for an advertising campaigns is how many viewers are tuned to (watching) a particular program at a particular time. The server of the measurement system can provide an estimate of the number of ad impressions expected to be delivered by an ad insert prior to the ad selection decision. The audience measurement system can also identify the type of program (available from published schedules) and when combined with other audience data sets, include additional viewer demographic information such as age, gender, geographic location, and psychographics, or even what kinds of products that consumer purchases in stores. The ad targeting criteria can then be established and placed into the configurable data field of the ad request using well known methods.

The audience measurement service or the MVPD that collects tuning data may also provide an actual count of impressions delivered after the ad insertion for purposes of reconciling with the forecasted impression load.

Figure 3:
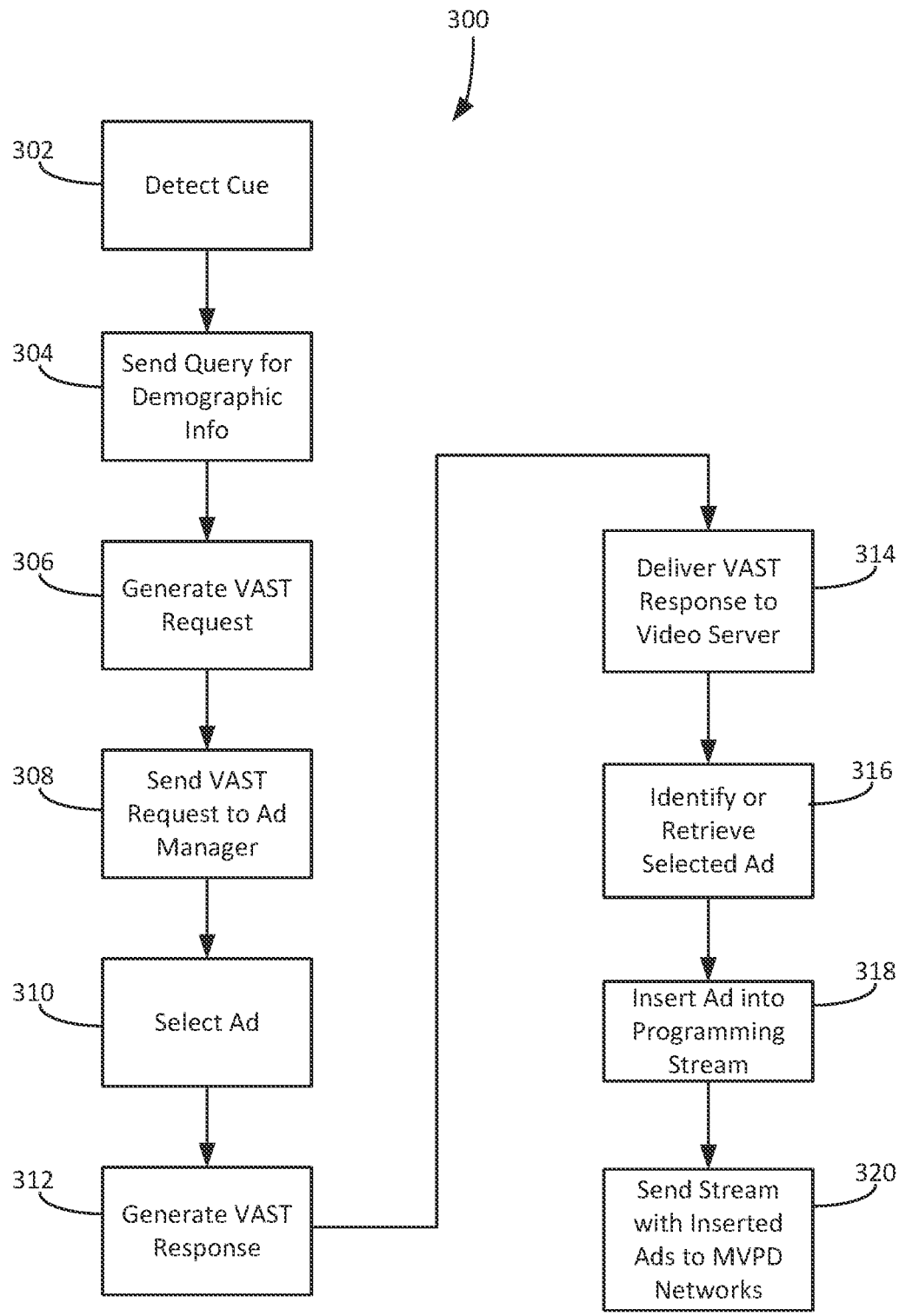
FIG. 3 is a flow chart illustrating a process for inserting ad content.

Referring to FIG. 3, a process 300 for inserting ads in video streams is illustrated. In step 302, a cue message is detected in the video stream received at the video server/ad splicer. The cue message is formed in accord with SCTE 35 and provides information regarding the location of the ad spot(s) in the video stream, such as the time point the ad spot starts in the video stream and the duration, although different providers may generate different formats for the cue message. For example, an SCTE 35 cue message is usually a binary message encoded in Base 64, and consists of a data packet with a number of fields that are used to describe attributes of the cue message. Although process 300 addresses a single cue message, in reality, a large number of cue messages are received in multiple programming feeds from multiple content providers.

In step 304, after detecting a cue message, the video server sends a query to obtain audience information for ad targeting, for example, an estimate of how many viewers are tuned to the channel for this programming feed at the requested time for ad insertion. Such information may be available from a third-party service. For example, some media measurement companies and MVPDs themselves may have an automated STB measurement/tracking solution that knows what every set top box in its network is tuned to and can therefore estimate how many ad impressions can be delivered at a particular time for a particular program. Other providers have additional useful information regarding customer viewing or purchasing habits, such as Experian, Nielsen Data Plus Math, Samba TV, iSpot.TV and others.

In step 306, a VAST request is generated to include configurable data fields as needed and appropriate. The VAST request is an XML data structure that indicates to the ad serving network when the ad avails will occur in the video stream and the duration of the avails. The demographic information or any ad targeting information can be added to the configurable data field to provide ad targeting criteria. The programmer's video commercial format is typically known from a periodic schedule distributed by the various content providers.

In step 308, the VAST request is sent to an ad manager for ad decisioning. For example, Google Ad Manager provides a variety of features for managing ad insertion, and may be implemented in a customized, local instance. In step 310, the ad manager selects or identifies an ad that meets the targeting criteria. The ad must be approved to play over the MVPD's network, and typically the video file has been prepped for playout on the MVPD's network, to include compliance with various advertising regulations and guidelines, including CALM compliance.

In step 312, the ad manager generates a VAST response to the VAST request, which describes the ad that should be played. The selected ad may be identified by providing a link to the ad location, or by actually retrieving the ad from local storage on the video server 230 or external resource 250. In one embodiment, the selected ad is identified by the ad manager in step 314 and the VAST response is delivered to the video server 230 in step 316. In another embodiment, the selected, pre-approved ad is retrieved by the video serving platform 130 after receiving the VAST response that identifies the (out of local network) location of the selected ad. The ad is then retrieved, encoded, distributed and stored in the Media Serving Platform for playout upon next request.

In step 318, the ad splicer inserts the selected ad into the video stream. Finally, in step 320, the modified video stream with inserted ad is transmitted to the various MVPD networks that are configured to display that video format. Thus, process 300 allows digital ad content to be inserted into any type or format of digital video stream, from any content source to any content distributor, whether cable TV, satellite TV, IPTV, or OTT.

Figure 4:
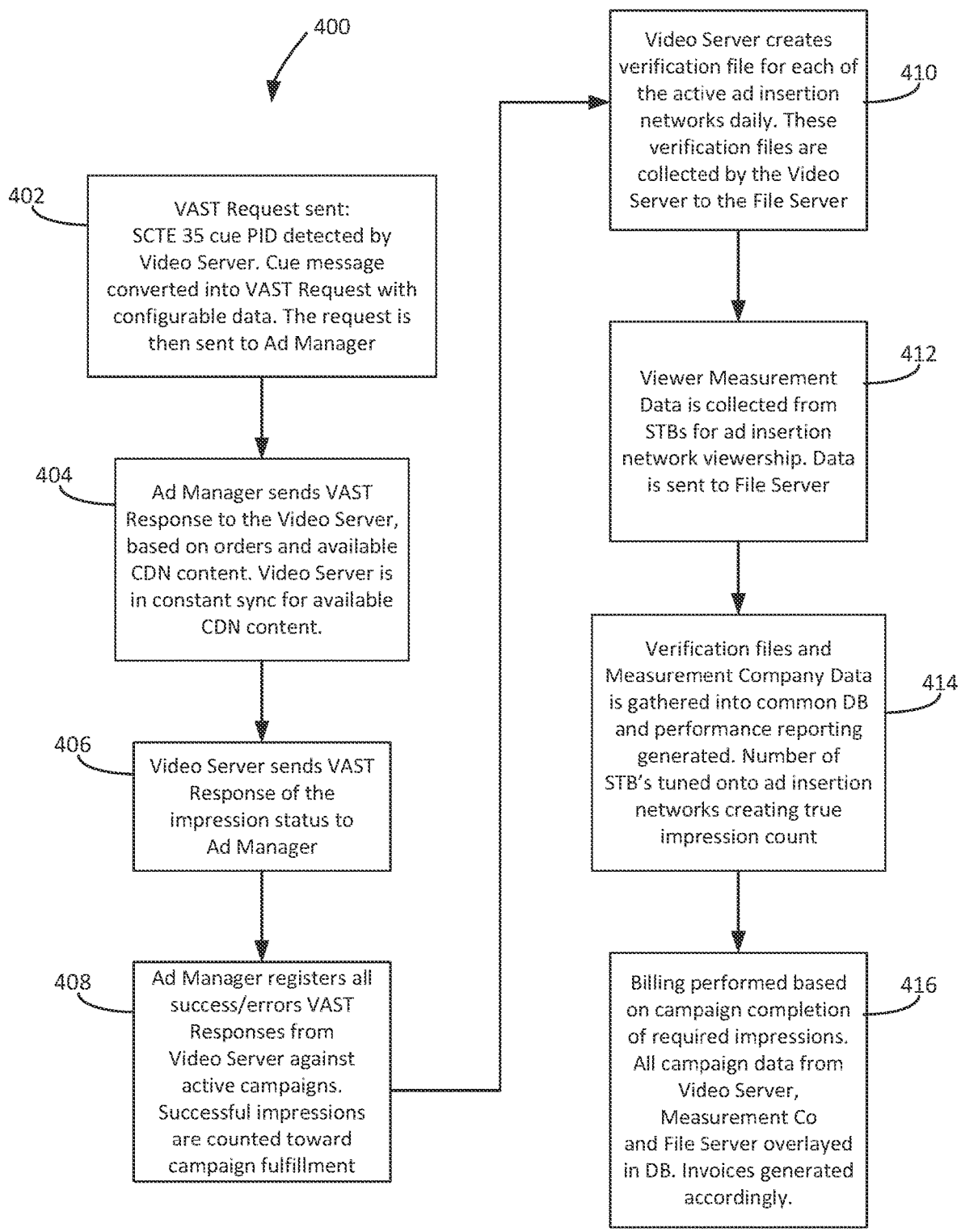
FIG. 4 is a flow chart illustrating another process for inserting ad content.

Another process 400 for inserting ads is illustrated in FIG. 4, with reference to the system 200 of FIG. 2. In step 402, the cue message in the linear programming stream is detected by the ad splicer/video server 230, and the cue message is used to trigger a VAST request having configurable data, which is then sent to the ad manager 240. In step 404, the ad manager 240 sends a VAST response back to the video server 230. The response includes ad targeting based on audience viewer information, and the response is also based on customer orders and availability of content, e.g., from storage in the CDN server 251. The video server 230 is in constant sync with the CDN server 251 so as to have current knowledge of the ad availability.

In step 406, the audience impression status, included in the VAST confirmation, is uploaded to the ad manager 240. In step 408, the ad manager registers all successes and failure of ad insertion at the video server 230. Successful impressions are counted toward ad campaign fulfilment.

In step 410, the video server 230 periodically creates a verification file for each of the active ad insertion networks, e.g., daily. The verification files are collected into the file server 252.

In step 412, viewer measurement data is collected from the set-top-box ("STB"), either directly or via third party viewership aggregation platforms, and this information is sent to the file server 252. In step 414, the viewer measurement data and the verification files are sent to the database 253 and performance reporting is generated. The actual verification and reporting of impressions served may come from a third-party audience measurement service or from the aggregation of tuning data from an MVPD. For example, the number of STBs tuned to the inserted ad represents the true household impression count.

Finally, in step 416, billing for ad insertion is performed based on campaign completion of required impressions. Relevant data is collected into the database 253 from the ad manager 240, the resources 250, and the viewer measurement server 260, and a final count of impressions served may be obtained from a third-party measurement service or from the aggregation of tuning data from an MVPD.

Figure 5:
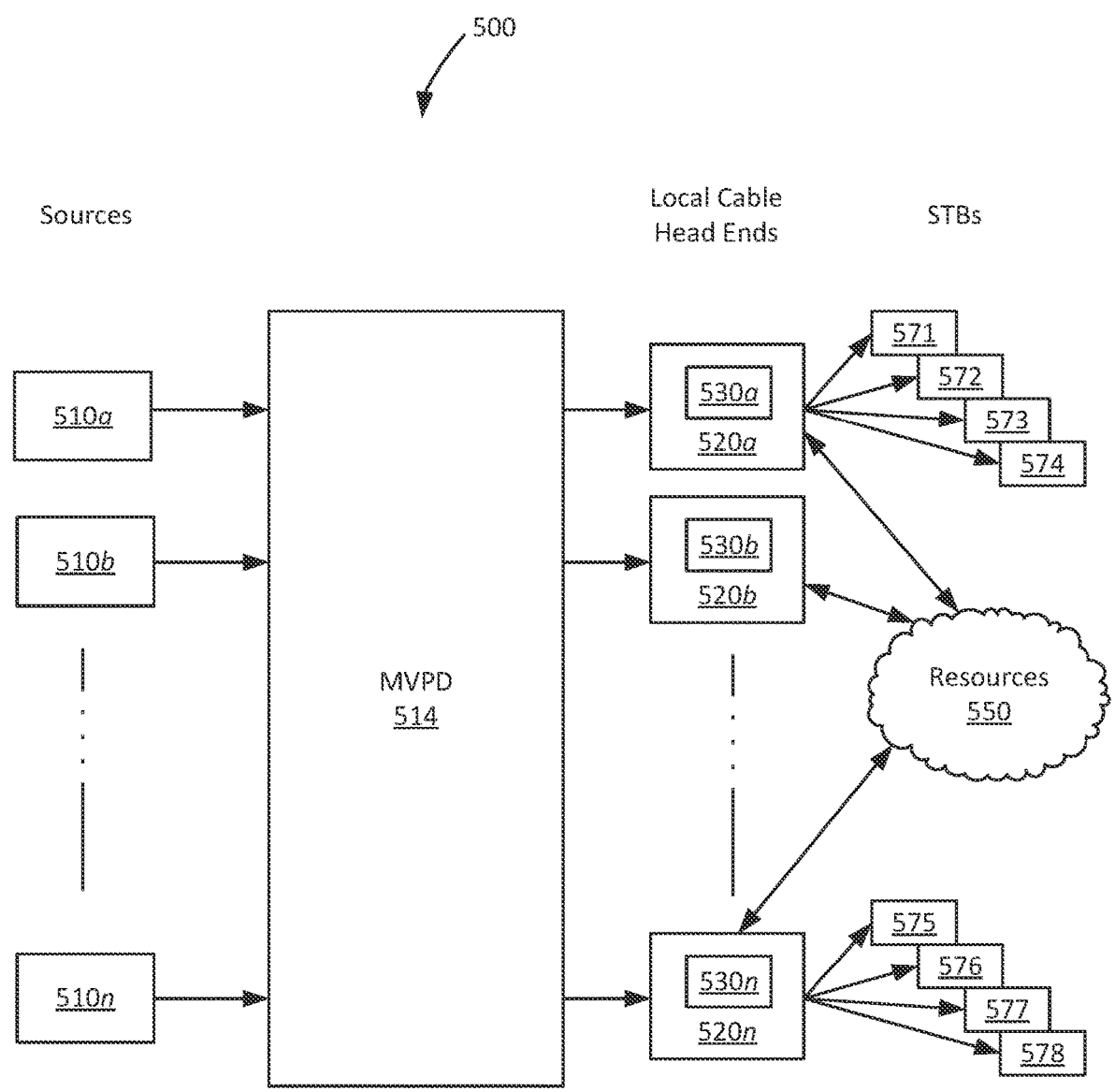
FIG. 5 is a block diagram illustrating a third embodiment of a system for inserting ad content into a linear programming stream.

An alternative embodiment showing system 500 is illustrated in FIG. 5. In this embodiment, a number of different content sources 510a through 510n provide programming feeds for MVPD 514. The MVPD distributes its programming feeds to the head ends 520a through 520n of local cable providers, which in turn send their programming feeds to individual STBs 571-578, for example.

Incorporated within each head end 520a through 520n of the local cable providers are video serving units 530a through 530n, respectively. Further, resources 550 are available to each head end to provide the services and features found in the ad manager, CDN, file server, database, and viewer measurement server, as described above. The video serving units 520 are configured to detect a cue message in the respective linear programming feed, and to receive a VAST request incorporating ad insertion location from the cue message and audience-based ad targeting information from the resources. A VAST response is then generated to fill avails as described above.

As noted above, digital ad serving technology has provided the ability to hyper-target the right audience in filling digital advertising requests by providing much more detailed targeting criteria. For example, in addition to providing knowledge of the basic demographics, such as gender, age income, location, education, psychographic, etc., digital technology can provide many other types of consumer preference data, including behavioral data such as past purchasing history or browsing history; dayparting data, i.e., the particular time(s) of the day that the consumer is active; designated market area (DMA); and other forms of data mining that may be helpful in designing ad targeting criteria.

The universal nature of the video serving platform described herein enables it to work in a multi-cast environment (one video feed to many STB's) or a unicast environment (one video feed to one STB). Because digital technology currently allows STBs to be individually addressed, there is an opportunity in the unicast MVPD environment to send an individual ad to an individual STB that is "requesting" the ad, based on hyper-targeting audience criteria. This opportunity benefits from the viewer's interaction with various data sources that help to define the individuality of the viewer from a marketing perspective, thereby enhancing the ability to hyper-target the individual viewer. Thus, addressable advertising provides another opportunity for potential advertising revenues.

Figure 6A:
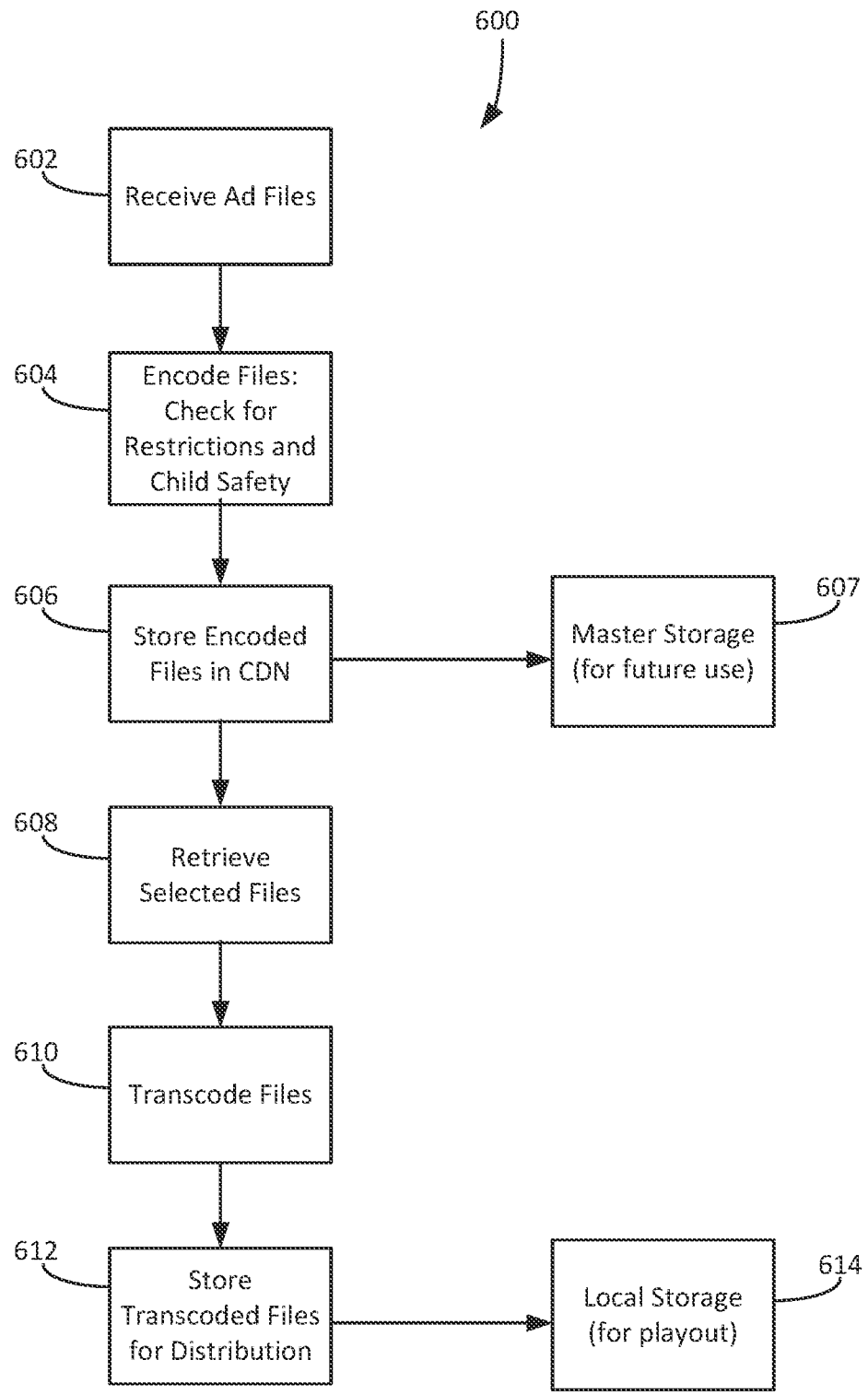
FIG. 6A is a flow chart illustrating a process for preparing an inventory of digital ads.

The ads to be inserted are (obviously) produced ahead of time by advertisers, provided to the ad serving network and stored for future use. A process 600 for receiving and storing the ads is illustrated in FIG. 6A. In step 602, ad files are received into the ad serving network, each file is encoded in step 604 and stored in the file server in step 606 and also stored to a master video file server in step 607 for future advertising needs. Files are retrieved in step 608. In step 612, the files are transcoded to the format of one or multiple specified content distributors. For example, the ad file may be converted from an MPEG2 source (commonly used in broadcast TV) to H.264 (MPEG4) video and AAC audio (common for streaming content). In step 614, the transcoded files are stored in the file server and available for selection and, in step 615, the transcoded files are sent to the local storage on the Media Serving Platform and available for ad insertion.

In one embodiment, a single ad spot may be transcoded into a number of different video formats such that the same ad (stored in different formats) can be provided to different content distribution networks.

Prior to storing ads for future use, each ad is reviewed for compliance with relevant regulations and guidelines. For example, each ad is reviewed to determine whether it contains salacious material, such as references to porn, guns, drugs, etc. Further, the video quality is reviewed, as well as any competitive risk posed by the ad. In addition, all ads must comply with the Commercial Advertising Loudness Mitigation ("CALM") provisions regarding audio volume.

Once ads are prepared, they may be sent to the video server or to a video cache or CDN. Low priority ads, overflow ads, and potential ads may be stored in a content distribution network coupled to the video server, and upon the first request for an ad by the ad decisioning server, the ad is pushed to the edge video server.

Ads may also be aggregated by a supply side platform ("SSP"), such as Adx, Freewheel, or Placemedia, that talks to the ad decisioning network. The SSP can aggregate ad inventory from any of the major MVPDs, such as Comcast, Charter, Altice, Cox, and others. The SSP can also receive instructions as to what ad inventory is available, for which networks, and for what time slots (for example, an MVPD may exclude prime time and the top 20-25 networks). Finally, the SSP can talk to a demand side platform ("DSP"), such as Trade Desk, Appnexus, Simplifi, Tube Mogul, and others, to engage is bidding for ad slots between the SSP and the DSP.

Figure 6B:
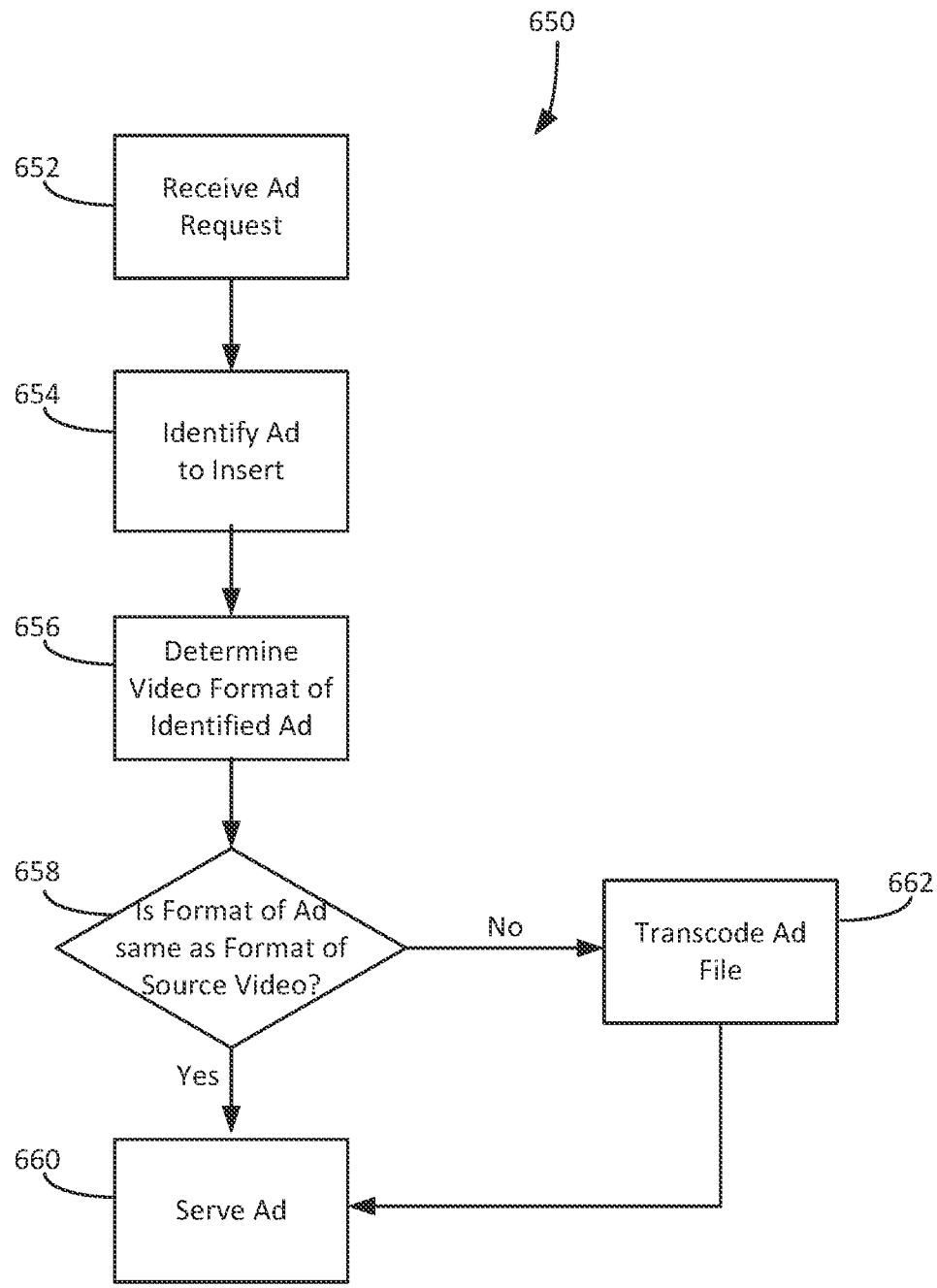
FIG. 6B is a flow chart illustrating a process for preparing a digital ad on the fly.

An alternative process 650 is illustrated in FIG. 6B. In step 652, an ad request is received at the ad serving network. In step 654, a suitable ad is identified, and in step 656, the video format of the identified ad is determined. If, in step 658, the video format of the identified ad is the same as the video format of the video stream that requested the ad, then in step 660, the ad is delivered. If the video format of the identified ad is not the same as the source video format in step 658, then the ad is transcoded on the fly in step 662 and then delivered in step 660. Typically, the location of the ad break in the digital stream is known at least a few seconds ahead of time, either in timing of the cue or, in the case of a "splice immediate" value in the cue message, with a configured buffer, in effect giving more time to complete the processes, thereby permitting a seemingly "live, real-time" ad insertion.

While the processes described above present a time-based ad insertion solution, it is also possible to have an event-based solution such as a live sporting event, and the cue message will include information to define the event and the ad insertion points.

Figure 7:
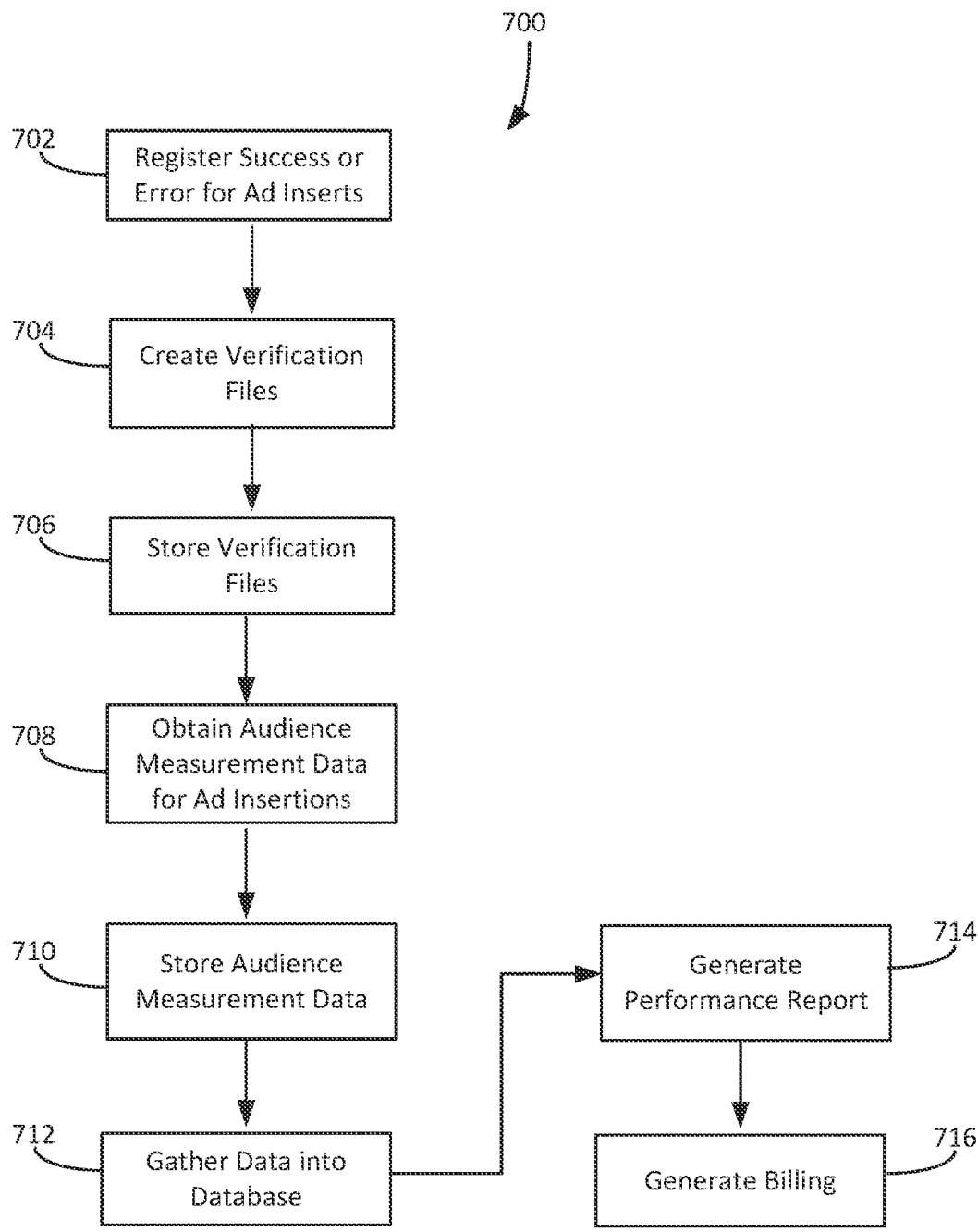
FIG. 7 is a flow chart illustrating a process for counting impressions to generate billings.

Turning now to FIG. 7, a process 700 for verifying and counting the number of impressions actually delivered is illustrated. In step 702, the ad serving network counts and registers all successful and unsuccessful ad inserts based on the responses from the video server. In one preferred mode, all successful impressions are counted towards a particular advertising campaign fulfillment. In step 704, verification files are created and periodically aggregated (e.g., daily) for each of the active ad insertion networks. The verification files contain information describing which ads were inserted into which networks, at what times. The verification files are stored in the file server in step 706.

In step 708, actual tuning (viewership) data related to the ad inserts is obtained, usually from a third-party service that measures actual viewing on STBs, for example. The viewership data indicates how many devices are tuned to a particular program, and for how long. This data provides a count of impressions delivered, and can also provide the demographic characteristics of the viewers. In step 710, the measured tuning (viewership) data is stored in the file server.

As an alternative, the verification files may be shared with the third-party service, which then obtains and stores the relevant audience measurement data and returns the data to the ad serving network.

In step 712, the verification files and the viewer measurement data are gathered into a common database, and may be used to generate performance reports in step 714. For example, the combination of the verification data and the viewer measurement data provides a true count of the household impressions actually delivered.

Finally, in step 716, billing to advertisers is generated based on the true count of impressions actually delivered for a particular ad campaign.

Figure 8:
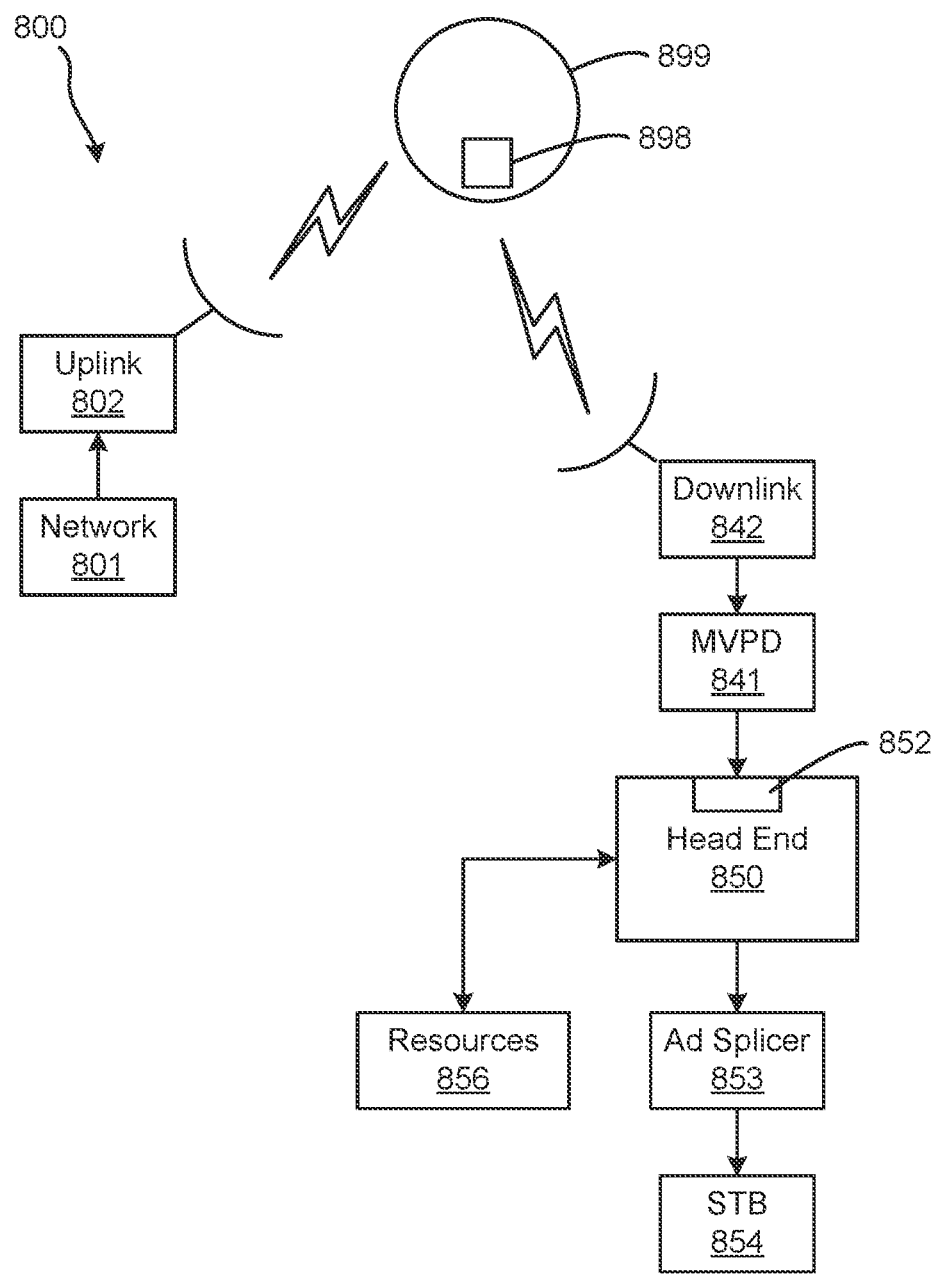
FIG. 8 is a schematic representation of an architecture for local ad insertion.

The foregoing concepts can also be applied on the network side to reallocate the national ad placements. For example, FIG. 8 is a simplified representation of both the network and distribution sides of a system 800 for delivering linear cable television programming to customers with digital ad insertion as described previously. A cable network 801 has an uplink system 802 including a parabolic dish pointed toward a specific satellite dish 899 in earth orbit. The cable network 801 generates programming feeds and transmits the programming feeds as digital signals at a specified frequency range via the uplink system 802, which are received by a transponder 898 affixed aboard the satellite 899 tuned to the specified frequency range. The received signals are then translated to a different frequency band (in order to avoid interference with the uplinked signal) and retransmitted back to an Earth station.

The translated signal is collected at MVPD 841 by a downlink system 842 having a parabolic dish and a downconverter that gathers the signals, amplifies the signals as necessary, filters the block of frequencies in which the signals are transmitted, and converts the signals to a lower frequency range, for example, in the L-band range, to reconstruct the programming feed.

The MVPD 841 distributes the programming feed to a local headend 850 that includes a video serving platform 852 as either an internal component (as shown) or an external component. The video serving platform 852 detects the SCTE 35 cue message that has been embedded into the programming feed as described above, and utilizes internal and external resources 856 as necessary to select an ad insertion for local spot cable, which is inserted by a video insertion device 853, such as an ad splicer, into the programming stream at the appropriate time, as the programming stream is delivered to STB 854.

We can apply these same principles on the network side to reallocate and select national ads. In general, the use of satellite services for cable and broadcast transmissions in the United States is regulated by the Federal Communications Commission (FCC), and uplink transmissions are typically broadcast in the C-band (4-8 GHz) or Ku-band (12-18 GHz) or both. The network operator (cable or broadcast) constructs the programming feed as a transport stream, namely, a series of MPEG-2 compliant digital multiplex bitstreams, in accord with ANSI/SCTE 57 entitled System Information for Satellite Distribution for Digital Television for Cable and MMDS.

For example, programming feeds prepared for uplink transmission from broadcasters and cable networks are generally constructed in the same manner, namely, as standardized digital data transport streams having multiple data packets that are multiplexed together for transmission to a specified satellite, either in real-time (or near real-time), or at a later-scheduled time. As described in SCTE 57, a particular data transport stream is identified by its Packet Identifier ("PID"), and the two main constituent streams of interest here are the Network PID and the Program Map Table PID, which are multiplexed together in the uplinked stream. The Network PID includes at least network information, network text, virtual channel information and system time, and the Program Map Table PID includes at least program information and program name. Thus, a typical multiplexed stream will include sequences of data packets that comprise Network PID streams and Program Map Table PID streams.

In general, each data packet has 188 bytes, with 4 bytes dedicated to a header, and 184 bytes allocated to the payload. The System Information Standard (SCTE 57) describes a number of tables and messages that can be delivered in transport packets that are identified by either the Network PID or the Program Map Table PID. Further, the standard provides extensibility through the use of (i) reserved fields and (ii) user private descriptors.

While the reserved fields are generally not available for assignment by the user, these reserved fields may be available for future use and could be utilized for encoding instructions to trigger action to obtain content for insertion as part of a national ad campaigns. However, the private descriptor fields are currently available to the user for assignment and may be placed throughout the messages described in the standard. For example, SCTE 35 cue messages are typically placed within a descriptor field of the Program Map Table PID, and the corresponding program information is carried in the Network PID and the Program Map Table PID when the transport stream is generated on the network side.

For example, the network prepares a manifest that includes programming information, including video content, and marketing information, and based on the applicable business rules for the broadcast network or cable network operator, a playlist is created and stored on the network CDN. At the scheduled time, the playlist is called and sent to the uplink system for distribution to the satellite then the MVPD. Typically, the playlist is prepared by the network in accord with the SMPTE BXF schema standard, which describes the network data to be packed into data packets of the Network PID and programming data to be packed into data packets of the Program Map Table PID.

Figure 9:
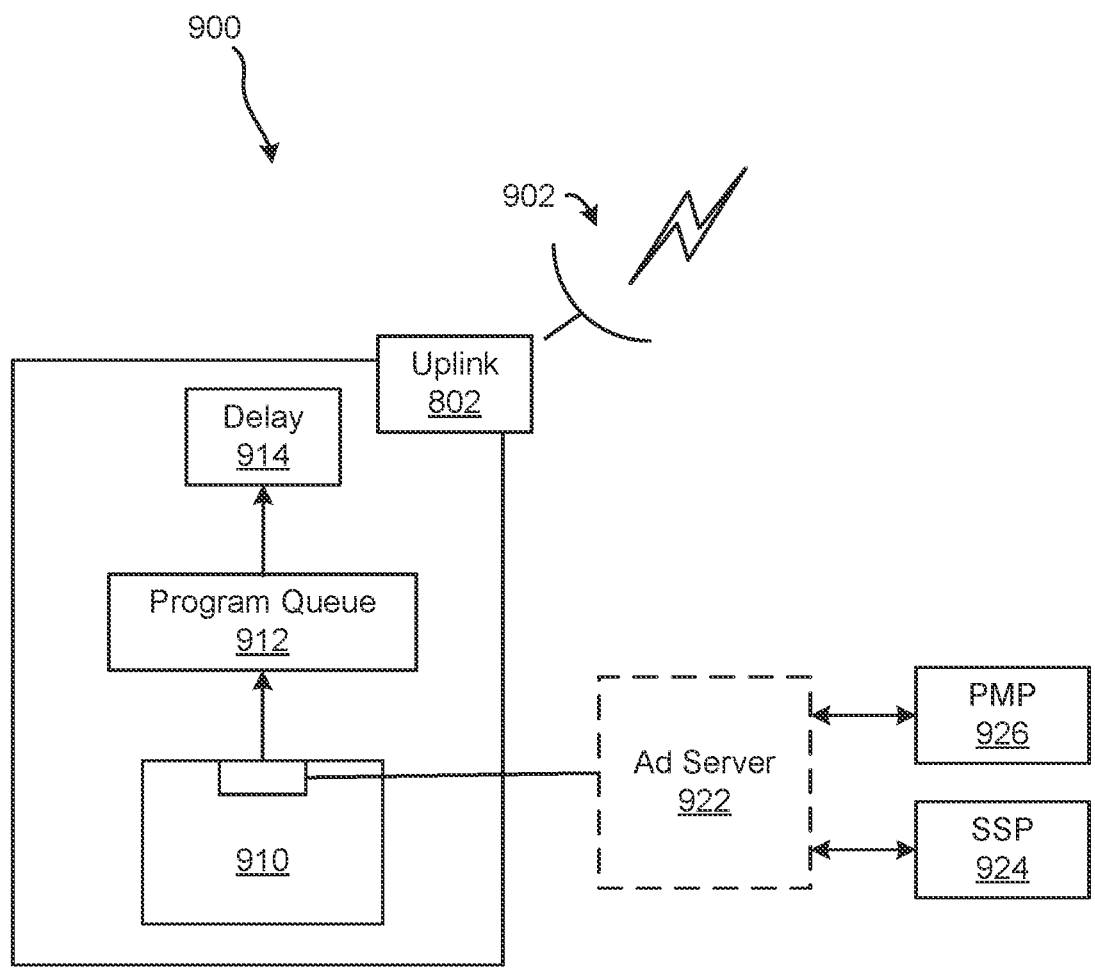
FIG. 9 is a schematic representation of a modified architecture on the network side, for national ad insertion.

FIG. 9 illustrates one scenario for a system 900 to deploy technology on the network side of system 800 (in FIG. 8) in order to specify ad insertions. In this scenario, the network 901 includes a scheduling server 910 that is configured to receive instructions that enable generating a program schedule including ad avails, and creating a program queue 912 stored on a network CDN that includes program content (or a link to the content) as well as an SCTE 35 cue message. The network program schedule is typically prepared 12-24 hours ahead of the playout schedule, and therefore there is a delay element 914 attached to the program queue 912 that delays providing the scheduled programming feed until the scheduled time, when the feed is provided to the uplink system 902 for transmission to the satellite.

In this embodiment, an ad selection device 920 is incorporated within the network 901, which may be part of the server 910 as shown, or may be an independent element located anywhere on the network side before the uplink system 902 on the network side. The ad selection device 920 is informed of the schedule, and in particular the ad avails allocated both for national ads and local ads in the programming stream. Based on the avails, the ad selection device 920 can select ads to fill the avails for either a national ad campaign or a local ad campaign.

The ad selection process on the network side may be similar to the VAST request and response process described above. For example, the ad selection device 920 may be automatically triggered when the manifest or playlist in constructed to prepare a VAST request with configurable fields that include at least program information, impression estimates and audience descriptors, and receives a VAST response. In this scenario, the VAST request/response process may or may not be real-time insertion process, as determined by each network according to its risk comfort level with manipulating the program manifest with more timely ad calls.

Alternatively, the VAST request for a national ad selection and insertion process may be triggered by incorporating an indicator in the SCTE 35 cue message, or by incorporating an indicator into another message constructed in a private descriptor field that is defined in the Network PID or the Program Map Table PID. For example, a selected bit in the header could be defined as a flag bit, and if the flag is set, a national ad selection and insertion process is called, and if the flag is not set, a local ad selection and insertion process is called. As described above, the ad selection device 920 may be located with the server 910. In the alternative scenario, the ad selection device 920 may be located anywhere on the network side before the uplink system 902, and the flag bit in a message constructed by the server 910 is detected by the ad selection device and triggers the appropriate ad insertion process.

The VAST request could be handled in several different ways, for example, by sending the request to an optional ad server 922, which then utilizes the resources of a supply side platform (SSP) 924 or a private marketplace (PMP) 926 to help prepare a VAST response to fill the avails, or the VAST request may be sent directly to either the SSP or the PMP for handling.

The network 901 can pull the ad content down from a specified URL that is defined in the VAST response and either process it for immediate playout, or store the URL link for use at the scheduled time. The PMP 926 refers to a real-time bidding process, which is an invitation-only, online auction environment for digital and programmatic advertising that leverages a publisher's ad inventory, typically to a select group of advertisers. Ad inventory is bought and sold at an impression level and is the product of a one-on-one deal between the publisher and the buyer, facilitation through the PMP 926. This allows the publishers to monetize their ad inventory more efficiently, for example, by setting rules regarding who can purchase impressions, thus facilitating a brand-safe environment. A demand side platform (DSP) serves as the ad buying platform and plugs directly into the publisher's ad inventory source, such as the SSP 924, where terms of a particular transaction may be pre-negotiated between the buyer and seller.

Thus, for a national cable network or broadcast network, the selected ad spot would run across the entire footprint of the national cable network or broadcast network, whereas for a local broadcast entity, the selected ad spot would still run across the entire footprint, but on a regionalized basis.

Figure 10:
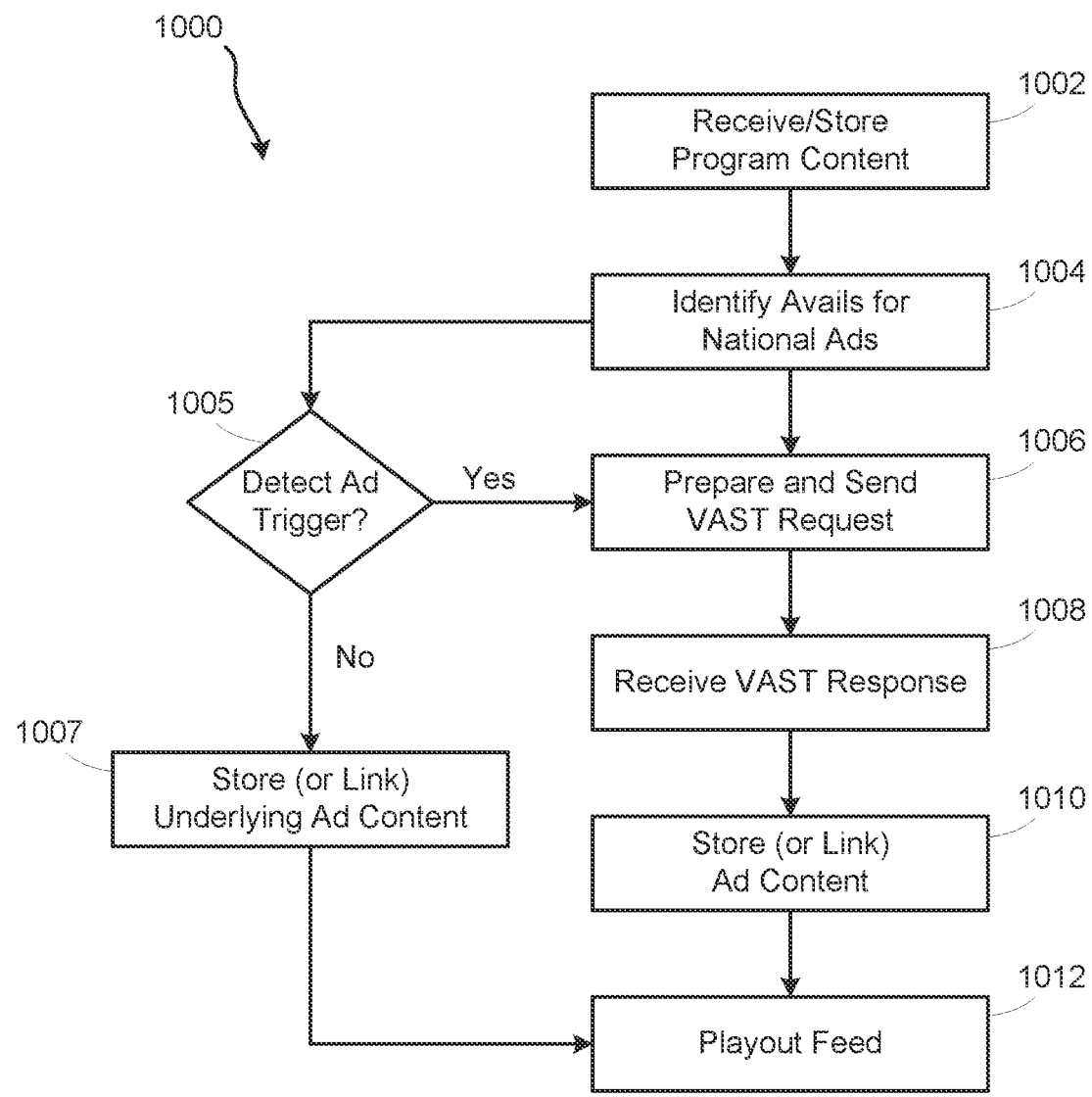
FIG. 10 is a flow chart illustrating an ad selection process on the network side.

FIG. 10 illustrates one example of a process 1000 for implementing ad selection on the network side. In step 1002, the network server receives and stores the playlist including program content. In step 1004, the server identifies avails for national ads. Once the ad avails are identified, filling the ad avails using a VAST request/response may occur automatically, or may be triggered by detection of a defined signal, such as the flag bit described above. In step 1005, if the ad trigger is detected, then in step 1006, the server prepares and sends a VAST request to the ad fulfillment network, whether based on an ad server, an SSP, or a PMP. The VAST request is prepared to include program information, impression estimates, and audience descriptors that are provided in the Network PID and/or the Program Map Table PID. If the VAST request is generated automatically, the ad selection/insertion process does not include decision step 1005, but proceeds directly to step 1006.

The VAST request is processed to generate and return a VAST response, which is received by the network server in step 1008, and includes either the ad content or a link to the ad content. In step 1010, the ad content (or its link) are stored with the program content in the program queue. Finally, at step 1012, the programming feed including identified program content and ad content is uploaded to the satellite for playout distribution.

If the ad trigger is not detected in step 1005, then an underlying ad will be selected in step 1007 and sent to the playout feed in step 1012.

Figure 11:
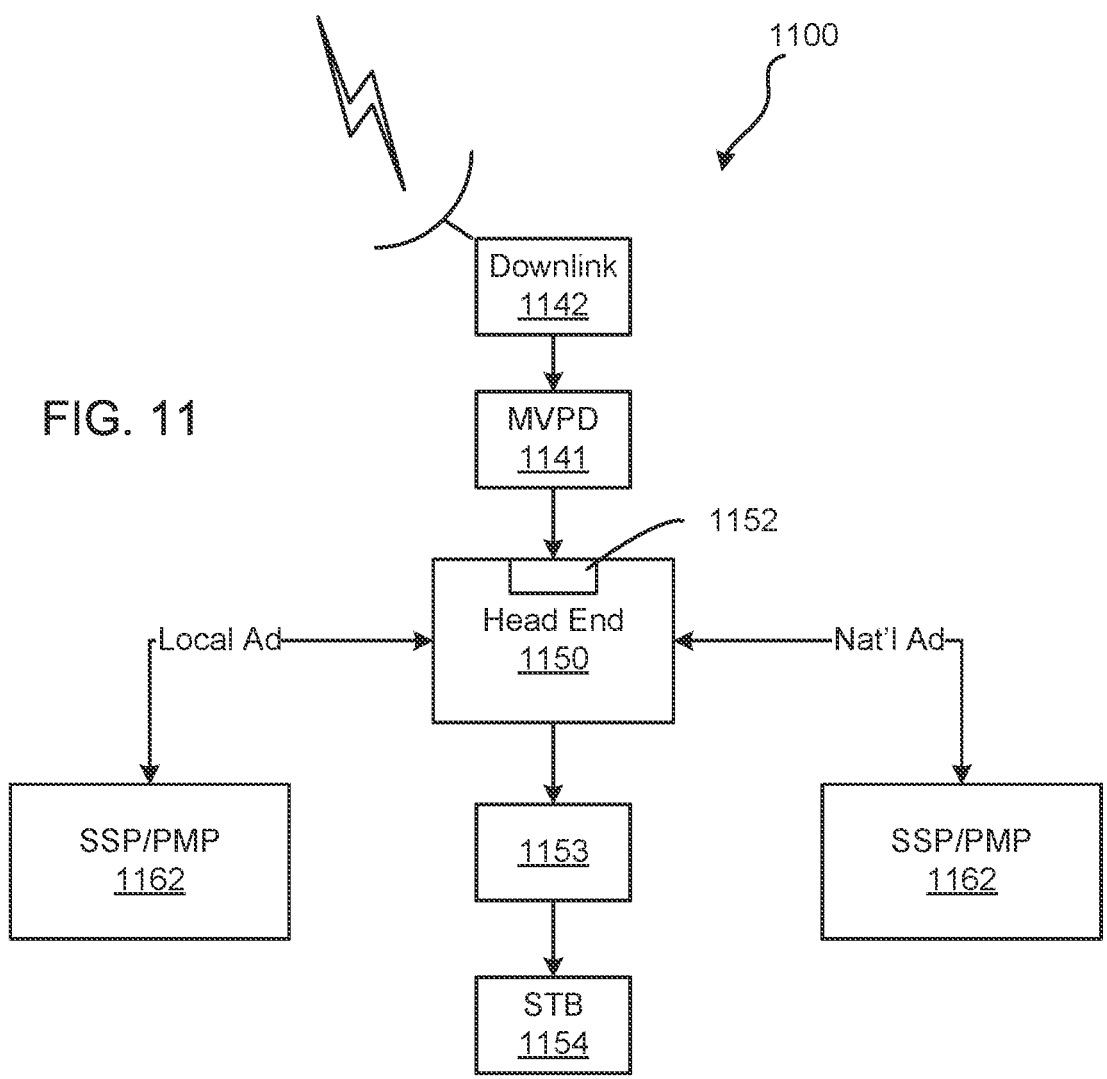
FIG. 11 is a schematic representation of a modified architecture on the distribution side, for national ad insertion.

FIG. 11 is a simplified representation of a system 1100 on the distribution side for delivering linear cable television programming to customers with digital ad insertion as described above. The downlink system 1142 receives programming streams from the satellite for MVPD 1141. The MVPD 1141 distributes the programming feed to local headend 1150 that includes a video serving platform 1152. The video serving platform 1152 is configured to detect a message in the programming feed and act upon that message, as will be further described.

For example, the message may be configured so as to indicate that a national ad is triggered and should be selected using resources 1162 (such as SSP or PMP) and played out for the designated ad avail, or alternatively, the message may configured so as to indicate that a local ad is triggered and should be selected using resources 1162 [same market resources 1162 for both national and local?? I think so—or should these be different] and played out for the designated ad avail. In one scenario, the message is an SCTE 35 cue message that has been provided with a flag in one of the configurable fields. If the flag is set, a national ad is selected. If the flag is not set, a local ad is selected. In a different scenario, if the SCTE 35 message is detected, with instructions to select a local ad insertion, then a local ad process will run. If the SCTE 35 message is detected with instructions to select a national ad insertion, then a national ad process will run. If the SCTE 35 message does not include instructions for selecting a local ad insertion or a local ad insertion, then a pre-approved underlying ad will be played out. These different scenarios are described below with reference to FIGS. 13-14.

Once the message in the programming feed has been interpreted by the video serving platform 1152, the selected ad is inserted by video insertion device 1153 into the programming stream at the appropriate time, as the programming stream is delivered to STB 1154.

Figure 12:
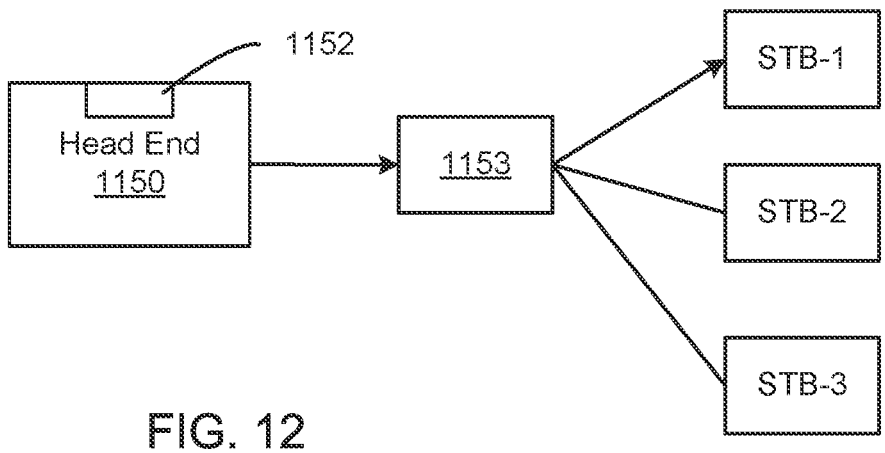
FIG. 12 is a schematic representation of an alternative modified architecture on the distribution side, for national ad insertion.

FIG. 12 illustrates a variation in which the detection module 1152 in the local headend 1150 is configured to identify a national ad insertion, but instructions included in the cue message identify different versions of the national ad which have been created for playout in different designated marketing areas (DMAs) or even in smaller defined areas within a specified DMA, or sub-DMAs such as an ad zone (usually defined as subscribers connected to a specific headend). Thus, the detection module 1152 detects from the cue message that a first ad version is targeted to a first DMA 1171, and instructs the ad splicer 1153 to insert the first ad version into the programming feed for all the STBs within the first DMA. Similarly, the detection module 1152 detects from the cue message that a second ad version is targeted to a second DMA 1172, and instructs the ad splicer 1153 to insert the second ad version into the programming feed for all the STBs within the second DMA; and so on for multiple DMAs.

In a further variation, as noted above, STBs are capable of being individually addressed. Thus, so long as the MVPD is capable of sending a specific ad to a specific STB, then the local ad can be so directed based on hyper-targeting audience criteria.

Advantageously, one of more additional layers of audience targeting may be added to the instructions to further narrow and better tailor the targeting effort. For example, in addition to targeting a specified DMA or a sub-DMA, or ad zone, one or more demographic factors may be added to the targeting criteria and used to select particular STBs within a targeted DMA or sub-DMA or ad zone that exhibit those demographic factors. The demographic information may be obtained from internal network sources, such as actual viewing history of users from STB feedback, or Internet activity of users, or from external sources such as third-party vendors that collect and analyze such information.

Figure 13:
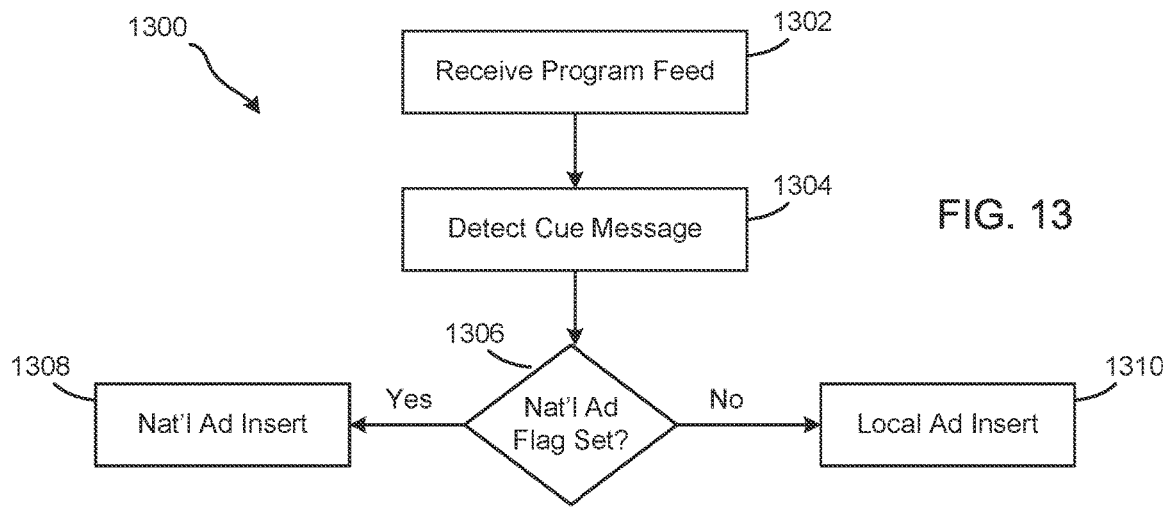
FIG. 13 is a flow chart illustrating one scenario for an ad selection process on the distribution side.

Referring now to FIG. 13, a process 1300 for choosing between national ad selection and local ad selection is illustrated. In step 1302, the program feed is received at the local headend. In step 1304, the SCTE 35 cue message is detected in the program feed. In this scenario, however, the SCTE 35 cue message has been provided with a "flag," i.e., a single bit that can be set or not. For example, if the flag is determined to be set in step 1306, then a national ad process is initiated to select an ad insert in step 1308. If the flag was not set in step 1306, then a local ad process is initiated to select an ad insert in step 1310.

Figure 14:
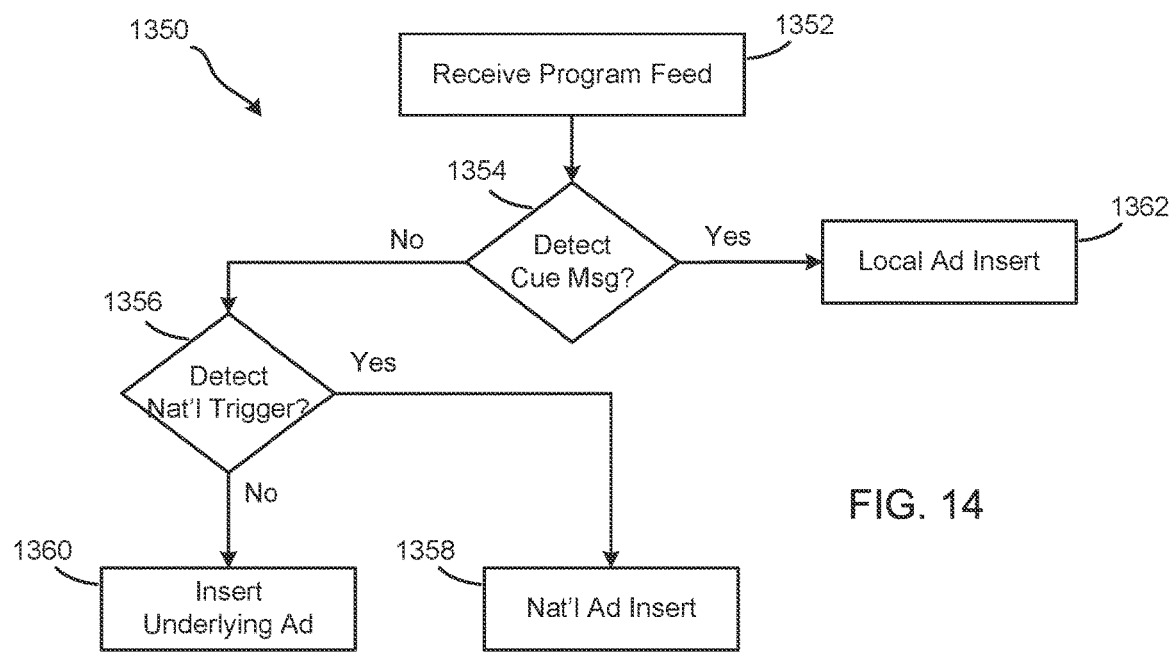
FIG. 14 is a flow chart illustrating an alternative scenario for an ad selection process on the distribution side.

FIG. 14 illustrates an alternative process 1350 for choosing between national ad selection and local ad selection. In step 1352, the program feed is received at the local headend. Step 1354 determines whether the SCTE 35 cue message has been detected in the program feed. If so, then beginning with step 1356, the cue message is analyzed to determine whether it includes a request for a local ad insertion, a request for a national ad insertion, or neither. In one example, a single flag bit may be included with the cue message to signify that the embedded data and instructions are intended for a request for either a local ad or a national ad, as described above. In other embodiments, other data fields in the Program Map Table PID or Network PID can be used to pass data and/or instructions that provide rules and criteria for determining what type of ad selection process to include within a particular program stream.

Thus, if it is determined in step 1356 that a local ad insert is requested by the instructions in the cue message, then the local ad insert process is run in step 1358. If not, then step 1360 determines whether a national ad insert is requested by the instructions in the cue message, and if so, then the national ad insert process is run in step 1362. If not, then an underlying ad that was previously identified and approved is played out in step 1364.

These alternative embodiments give the network the ability to target multiple criteria, such as demographics and geography together, in their ad playouts. Further, the use of network side ad selection and distribution side ad selection can work together to provide a national real-time VAST process and a local real-time VAST process. In addition, these alternative scenarios allow the network and MVPDs to easily reallocate ad inventory between the local ad spots and the national ad spots. For instance, the time allocated for local ad insertions could be increased during the political season when geo-targeting is important, and reduced during the national television ratings (sweeps) season.

Although system configurations illustrated herein are shown as fixed hardware systems on the network side or the distribution side, the various features could also be cloud-based, or a hybrid solution including cloud-based features.

Although the foregoing methods and systems provide alternative ad insertion strategies for linear programming, the continued existence of legacy hardware presents some difficulties for implementing those strategies. For example, older ad splicers in some cable head ends may not accept a command to force the insertion of an ad from an alternative source, as described above. These legacy systems thus rely on the schedules published and distributed by programming networks to plan for and carry out ad insertions. However, this "time-based" approach to linear ad insertion can be adapted to use the techniques described above.

As an initial matter, each programming network creates and publishes a unique programming schedule for each day for each of its channels (if more than one) including the local ad break structure and ad insertion format. A number of third-party vendors consolidate and standardize the various network programming schedules into a comprehensive "programming file" having a standard format and commonly referred to as a CCMS schedule, after the company that first standardized this information, Cable Computerized Management Systems, Inc. For a fee, local stations or MVPDs can import the comprehensive programming file from a third-party into their local traffic and billing system, which enables them to create their own local ad insertion schedule file for scheduling ad placements and to bill for actual airings of ad copy. The scheduling information includes the approximate timing for local ads to be delivered and inserted by the ad insertion server in the local headend, by specifying an ad window at a fixed time and an ad break at an approximate time within the ad window.

For example, a typical local ad insertion schedule file has a filename format such as "MDDCCHHH.SCH" where M represents month (hexadecimal range 1-C); DD represents day of the month (decimal range 01-31); CC identifies the channel (decimal range 01-99); and HHH identifies the headend (decimal range 001-099). The typical schedule file has the file extension "SCH" and data records within the file contain twenty-four hours of programming information, typically midnight to midnight. There is also a standard verification file (not shown) with the same filename and the file extension "VER" that contains data records for everything that actually aired on the date.

The records contained in the local ad insertion schedule file (and the verification file) each include a number of predefined data fields, each data field containing relevant information about a network broadcast, with one example of a data record 1500 illustrated in FIG. 15, such as type of broadcast, scheduled date of broadcast, scheduled time of broadcast, etc. One record corresponds to one broadcast event.

Figure 16:
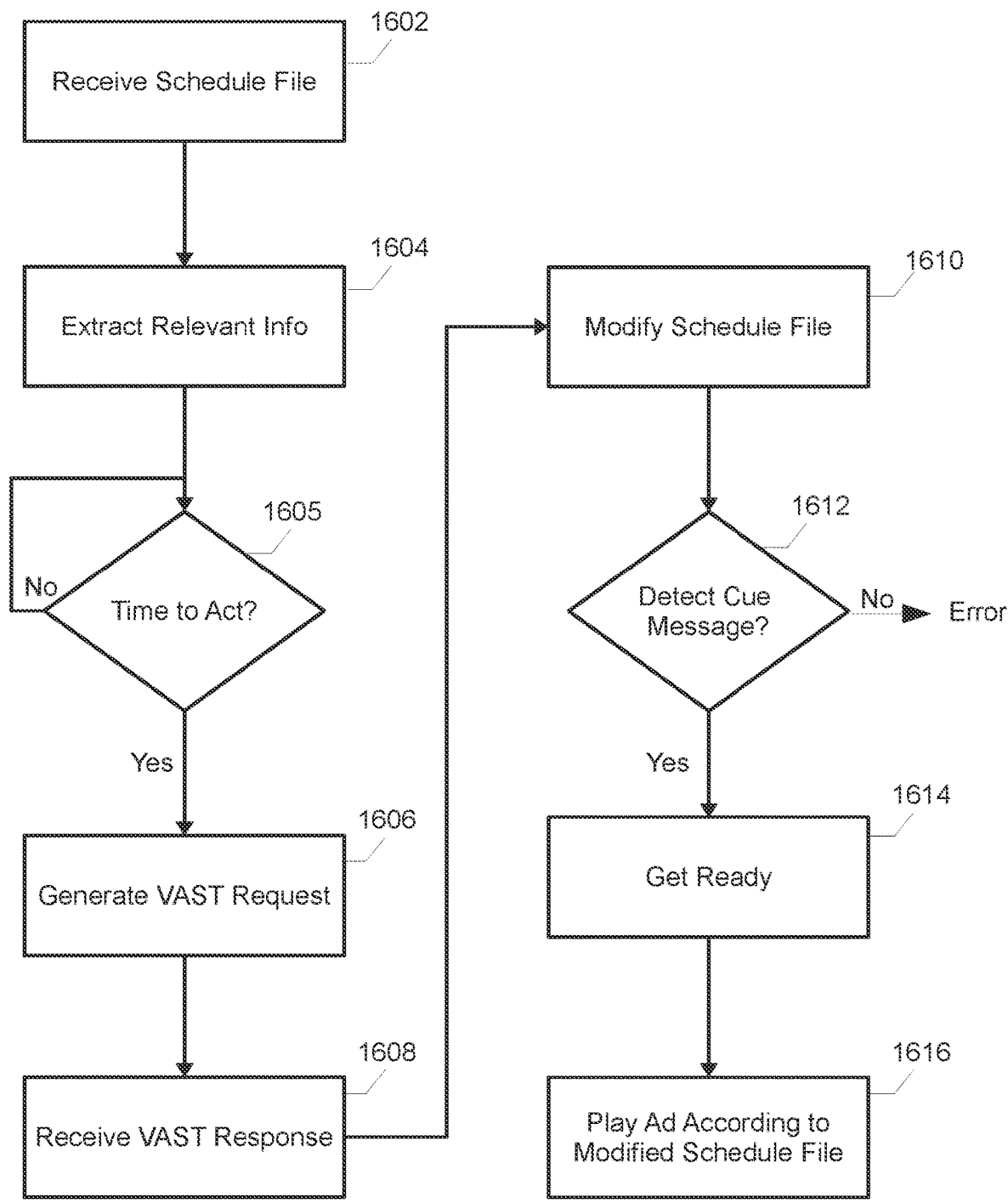
FIG. 16 is a flow chart illustrating a time-based process for ad insertion.

FIG. 16 illustrates a simplified process 1600 for time-based ad insertion in a linear programming feed. The process 1600 is typically implemented by one or more servers configured either as a web-based service or a hardware-specific solution for decision-making and ad selection/insertion. In step 1602, the daily ad insertion schedule files are generated in the traffic and billing portion of the system and received into the ad insertion portion of the system as well as sent to the ad serving hardware in the local headend. While the remaining steps are described with regard to a single ad insertion schedule file, it should be recognized that the process will be repeated for as many schedule files as are received. In step 1604, relevant information is extracted from the ad insertion schedule file, in particular, the expected start time of the ad window, and the expected duration of the ad window.

In one implementation, the video insertion hardware waits until shortly before the expected start time of the ad window before generating and sending the VAST request. Thus, in step 1605, if the time is x minutes before the expected start time of the ad window, the relevant information extracted from the schedule file and other sources is incorporated into a VAST request in step 1606 and sent to a third-party service to select and identify an ad for insertion in accord with the parameters provided in the VAST request. In step 1608, a VAST response is received identifying an ad to insert. In step 1610, the ad insertion schedule file is modified to replace the original ad spot identified in a data field of the ad insertion schedule file with the ad identified in the VAST response. The modified local ad insertion schedule file is then re-imported into the ad insertion platform and re-exported to the ad serving hardware in the headend. Now the system waits. When the SCTE 35 cue message is received in step 1612, then the ad insertion hardware is made ready in step 1614 and proceeds to play out the ad identified in the modified schedule file in step 1616.

Figure 17A:
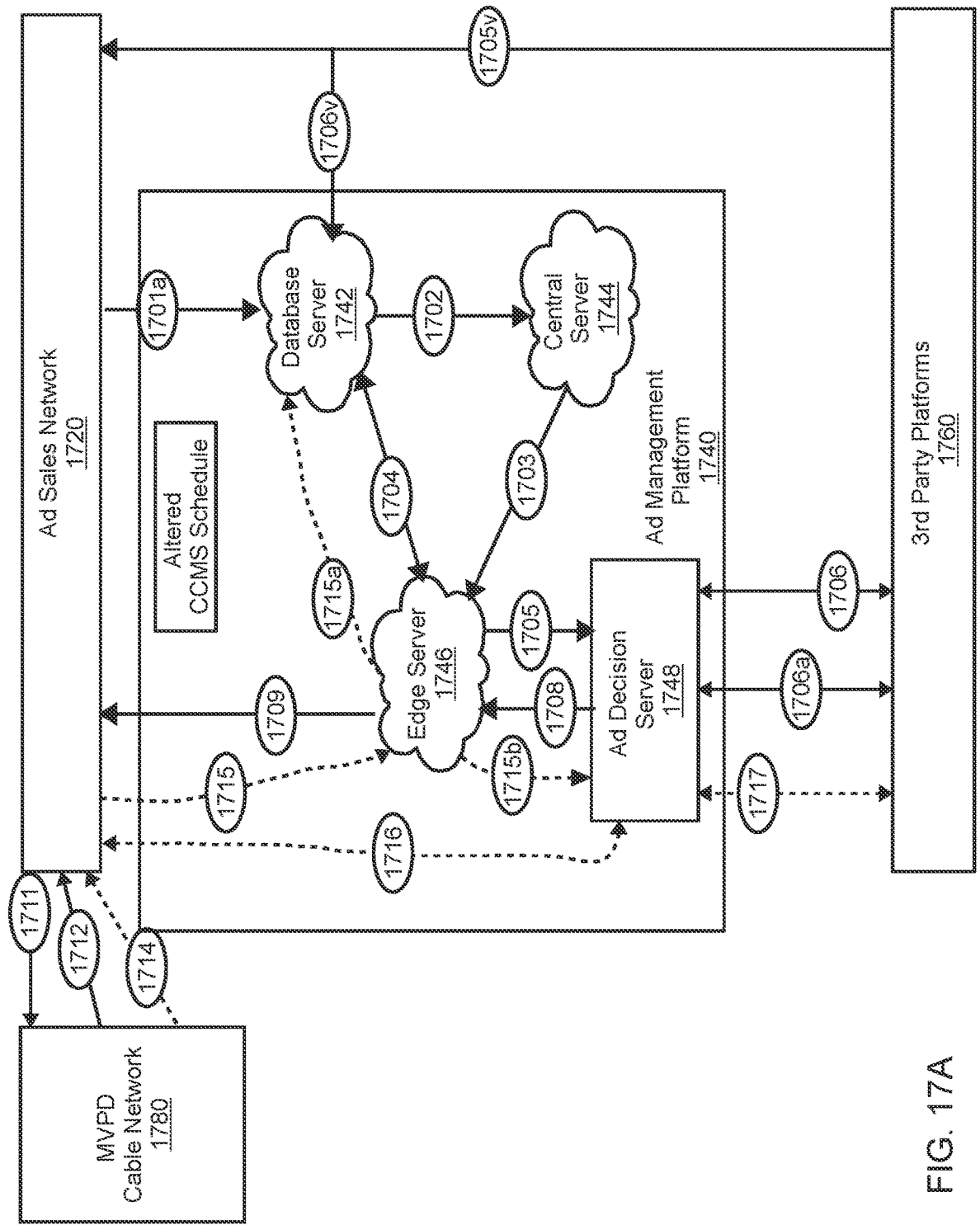
FIGS. 17A and 17B are flow diagrams illustrating the flow and interrelationships between various components of a time-based process for ad insertion.
Figure 17B:
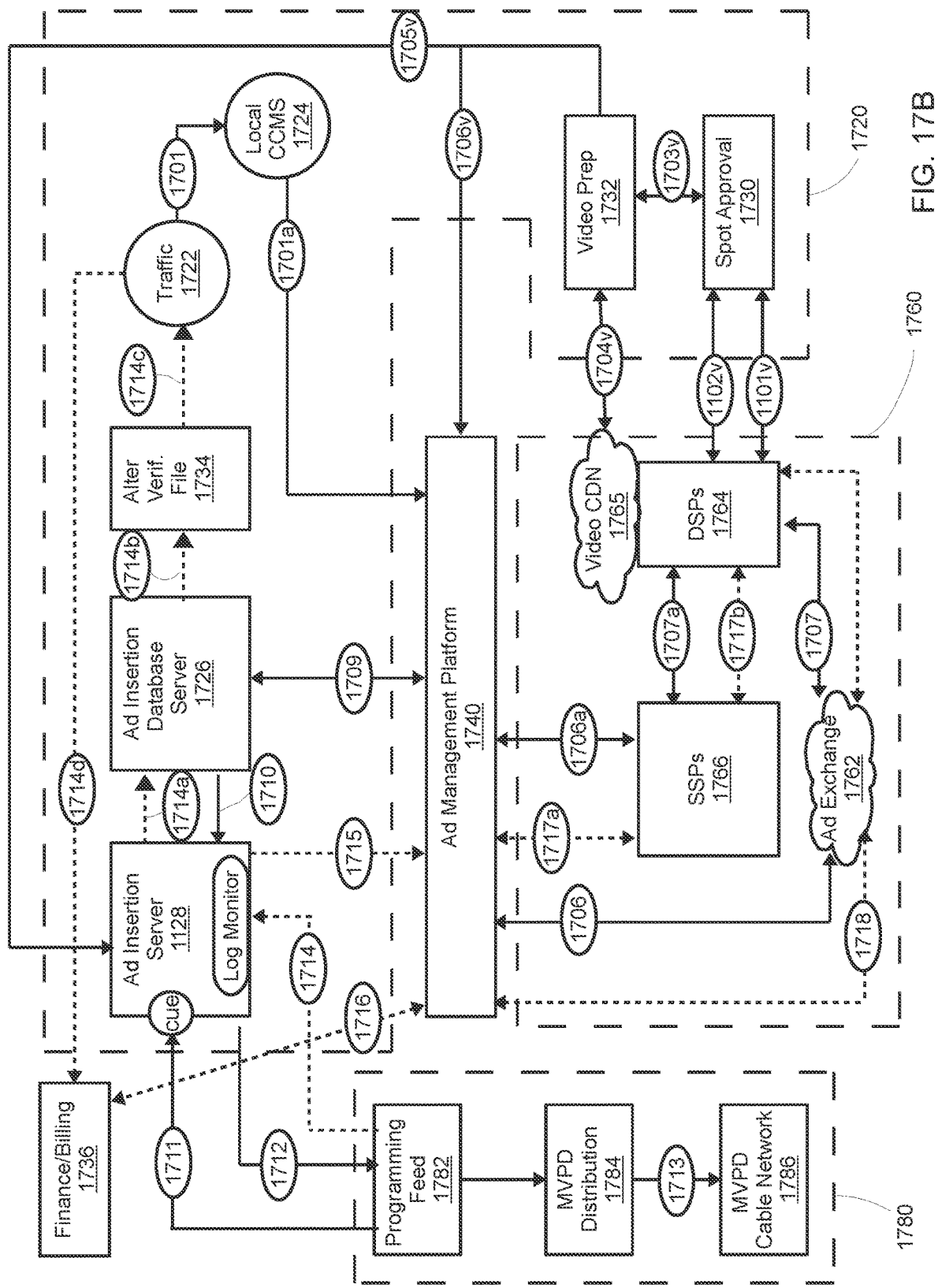

Referring now to FIGS. 17A and 17B, a detailed embodiment of a time-based workflow for ad insertion is illustrated that shows the interrelationships of the various components that are distributed among the various entities involved in the process, including the MVPD ad sales network 1720, the ad management platform 1740, various third-party ad content platforms 1760, and the MVPD cable system network 1780.

Traffic system 1722 is part of the ad sales network 1720 and is the beginning of the workflow when it receives the daily programming schedule files from a third-party vendor for channels offered by the MVPD to its subscribers. The traffic system 1722 via path 1701 generates the local ad insertion schedule files using ad placement data from the programming schedule files and the ad insertion orders from the various sales channels, and publishes the local ad insertion schedule files to the workflow path for further processing and distribution.

The schedule and related data are passed from the traffic system 1722 and other data sources 1724 via path 1701*a* to the database server 1742 on the ad management platform 1740. Although not illustrated, adequate memory and storage are available to each server in the ad management platform 1740.

The database server 1742 passes all the data for the VAST request via path 1702 to a central server 1744. The central server 1744 in turn passes the data provided via path 1703 to an edge server 1746. The edge server 1746 holds on to the data until it gets a trigger signal established by the database server 1742 analysis of the local ad insertion schedule file and shared with the edge server 1746. The edge server 1746 monitors the open window data in the relevant program schedule file and sets the trigger for initiating ad selection at the edge server 1746 at an appropriate time prior to the expected ad window. For example, the time for initiating the ad selection process may be set for 15 minutes prior to the ad window start time of the ad window in the schedule file or at some other time to provide more than adequate time for ad decision and selection given the variable ad window. When the time set for the trigger is detected, the edge server 1746 prepares and sends the VAST request via path 1705 to an ad decision server 1748, and the ad decision server forwards the request on to one or more third-party providers 1760. There is also a use case where the VAST request goes directly to third party providers, simply skipping the ad decision server 1748 if only acting as a pass through.

For example, the ad decision server 1748 can interact via path 1706 with an ad exchange service 1762, such as Google Ad Manager, in order to interact via path 1707 with demand-side platforms 1764 to engage in bidding for ad slots. If bidding is successful, then one of the DSPs 1764 returns information about the selected ad via path 1707 to the ad exchange 1762, which forwards the information via path 1706 back to the ad decision server 1748 for preparation of the VAST response.

It is noted that the information about the selected ad returned to the ad decision server 1748 typically does not include the video content of the ad itself, which is directed along a different path 1702*v* as further discussed below.

On alternative path 1706*a*, the ad decision server 1748 can instead interact directly with supply side platforms 1766 to engage in bidding for ad content, and if successful, information to fulfill the VAST request is returned via path 1706*a* to the ad decision server 1748.

One other alternative is that interaction with the DSPs 1764 can result in a transaction in the Private Marketplace ("PMP"), which can make ad space available before going to the open markets of the SSPs and DSPs. If so, then the PMP transaction is communicated via path 1707*a* to the SSPs 1766, which in turn communicate the transaction via path 1706*a* to the ad decision server 1748, or in some use cases, the SSP may communicate the VAST response via path 1706*b* directly to the edge server 1146.

Thus, upon selection of a replacement ad from the third-party platform 1760, the relevant information for a VAST response is provided back to the ad decision server 1748 (via path 1706 or 1706*a*), and the ad decision server prepares and returns the VAST response via path 1708 to the edge server 1746 identifying the replacement ad; or if the ad decision server is bypassed the VAST response may go directly to the edge server via path 1706*b*.

The edge server 1746 then modifies the schedule file to replace the originally identified ad with the replacement ad. The modified schedule file is sent via path 1709 to the ad insertion database server 1726 and then via path 1712 to the ad insertion server 1784 in the headend.

The ad insertion server 1728 monitors the programming feed 1782 from the MVPD cable system 1780 via path 1711 in order to detect the SCTE 35 cue message in the programming feed. When the cue message is detected, the ad insertion server 1728 inserts the ad identified in the modified schedule file via path 1712 into the programming feed at the local MVPD headend 1784, and the replacement ad plays out to subscribers 1786 via path 1713.

Returning to the question of ad video content, when an ad has been selected through the third-party platform 1760, the ad content is sent to the sales network 1720 via path 1701*v* for spot approval 1730. Whether the ad content is approved or not is provided as information via path 1702*v* back to the DSPs 1764. If the ad content is approved, it is passed via path 1703*v* to module 1732 for formatting and other preparation, then uploaded and saved into a content delivery network ("CDN") 1765.

The video content for the replacement ad is retrieved from CDN 1765 and transmitted to the ad insertion server 1728 in advance of any associated VAST response. The ad insertion server inserts the video content via path 1712 into the programming feed at the specified time.

Once the replacement ad has played out, the MVPD network 1784 generates a verification log and sends the log via path 1714 to the ad insertion server 1728. The ad insertion server 1728 in turn sends the verification log to the ad insertion database server 1726 via path 1714*a*, and also provides the playout status to the edge server 1746 via path 1715. The ad insertion database server 1726 alters the original verification file at module 1734 via path 1714*b* to fail the original ad; that is, the original ad was preempted by the replacement ad and therefore the original ad did not play and that "Failed" status is recorded in the modified verification file. The modified verification file is finally sent to the traffic system 1722 via path 1714*c*, which compares the insertion order to the verification file, creates a billing record of such and sends the compiled billing files to the finance and billing module 1736 via path 1714*d* at the appropriate time for billing processes to start. The finance and billing module 1736 processes the information supplied by the modified verification log and the linear order information to create the billing files for printing and electronic delivery.

The edge server 1746 passes the comprehensive transaction data provided via path 1715 to the database server 1742 via path 1715*a* for monitoring and reporting. The edge server 1746 also sends the data to the ad decision server 1748 via path 1715*b* for forwarding to the finance and billing module 1736 via path 1716 to reconcile billing data. The ad decision server 1748 receives billing and reconciliation data from the SSPs 1766 via path 1717*a*, which in turn obtains data from the DSPs 1764 via path 1717*b*, or directly from the DSPs (through ad exchange 1762) via path 1718. The database server 1742 stores the data for reconciliation with revenue and billing performance data compiled by the SSP 1766 for remuneration to inventory publishers.

Thus, a method using a time-based workflow simply alters the schedule file to replace the original ad spot with a replacement ad selected using the VAST protocol for ad selection.

As noted above, for any linear program feed distributed by a national broadcaster or national cable network, most of the ad spots are filled from national ad campaigns while a few ad spots are left for local advertisers to fill. However, since there is often unsold or undersold ad inventory from the national ad campaigns, it would be desirable for broadcasters or cable networks to try and maximize ad revenues by using up the available ad inventory at the highest possible prices if possible.

A national broadcaster, a regional broadcaster, and a national cable network generate and transmit source programming content and are therefore able to create and/or modify a linear program feed and/or program schedule prior to uplink and distribution to local broadcast affiliates or regional and local cable operators. This includes adding a trigger or cue message into the program feed prior to uplink in order to inform the distribution side regarding a local ad spot to be filled, as described above. However, a secondary trigger or cue message could also be embedded into the program feed in the same manner in order to inform the distributor regarding a national ad spot that can be preempted by digital programmatic platforms and instead filled with a different national ad for different geographic areas using the available national ad inventory. Further, the preemption could be targeted at any geographic or structural level of the program distribution chain by providing appropriate designated available inventory access to digital programmatic platforms as well as to the ad selection process described herein for selecting from the designated available inventory.

Figure 18:
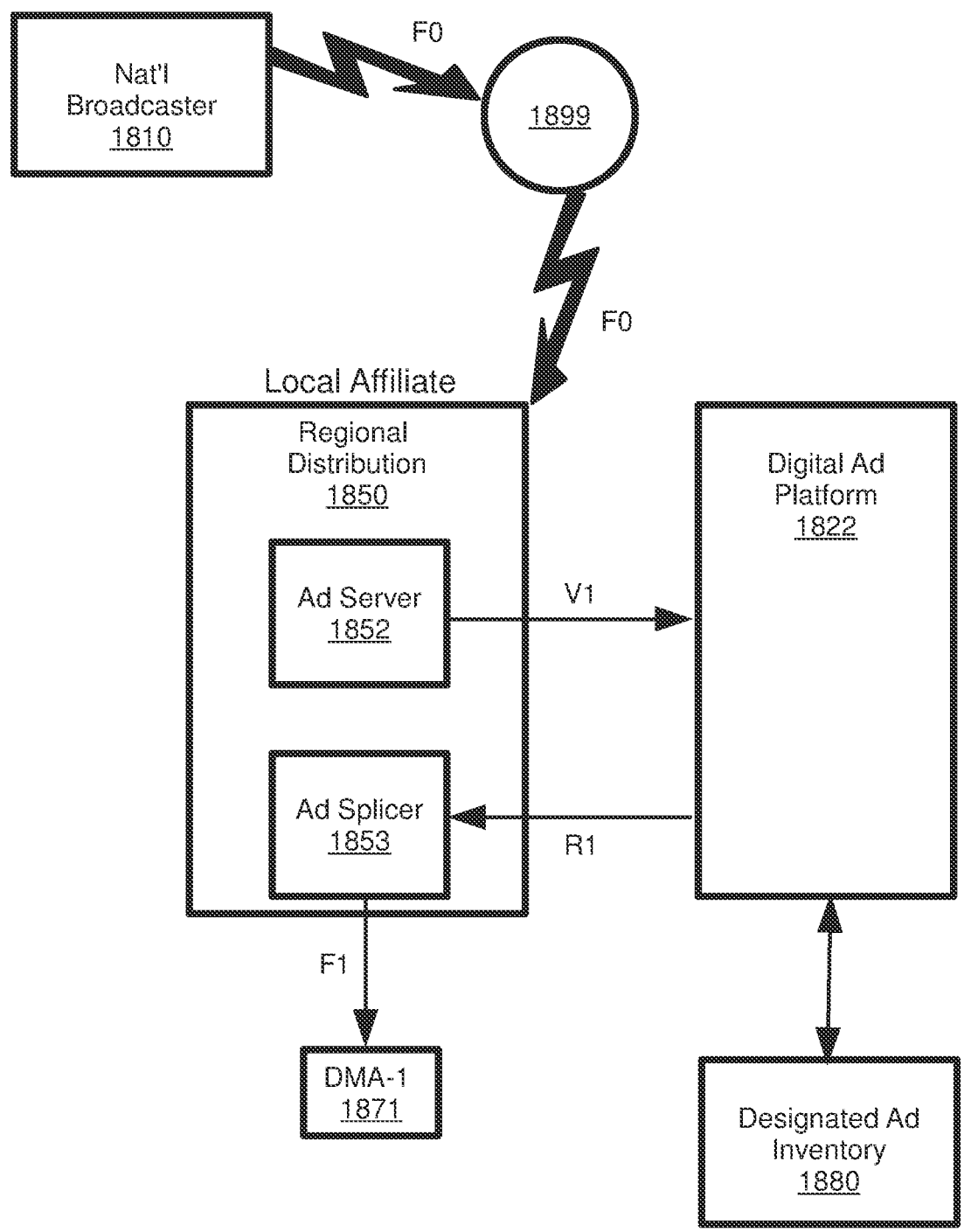
FIG. 18 is a schematic representation of an architecture for national ad preemption at the DMA level.

A typical architectural arrangement for the national broadcaster and its local affiliate is illustrated in FIG. 18, where the original linear program feed F0 is transmitted by the national broadcaster 1810 via uplink to satellite 1899. The program feed F0 is then received through a downlink at a regional distribution center 1850 owned and operated by the local affiliate of the national broadcaster.

Thus, in a first scenario, the national broadcaster seeks to target national ads from unsold/undersold inventory at the DMA level. Since regional distribution center 1850 is controlled by a regional affiliate of the national broadcaster 1810, the national broadcaster can effectively preempt any national ad spot intended for any DMA within the coverage area of its local affiliates by modifying the program feed to the affiliates accordingly.

An ad server module 1852, which may be integrated with the regional distribution center as shown or configured as a standalone module, is configured to detect trigger signals in the program feed. Upon detection of the secondary trigger signal calling for preemption of a national ad, the ad server 1852 generates a VAST request V1 for selecting a different national ad specifically targeted for DMA-1 1871, and sends the VAST request to digital ad platform 1822 for an ad selection routine as described above. The VAST request includes program information and relevant targeting criteria, often obtained from external sources, but the requests also identify and provide connectivity to the available ad inventory 1880 for use in selecting a replacement ad. Although the targeting criteria and the identification of available inventory is uploaded from the affiliate or the broadcaster into the ad platform for use in the ad selection routine, but could also be provided within the cue message as described above.

Upon receiving the response from the ad platform 1822, ad splicing equipment 1853 uses the link provided to retrieve the corresponding ad from its storage location and insert the ad selected from the designated available inventory in accord with targeting criteria into a newly generated program feed F1 and distribute that feed with the replacement ad identified to a local distribution center 1871 that covers DMA-1.

In a second scenario, the national broadcaster seeks to target its available ad inventory at the advertising zone level. Zones are subsets of DMAs, defined as needed in accord with the business rules set forth by a cable distributor. However, whereas national broadcasters can serve their own ads directly to the DMA level through its regional distribution centers, as described above, the zone sublevel must be reached through independent local cable distributors, and thus the national broadcasters must collaborate and have agreement with the independent distributors further down the distribution chain in order to serve the broadcasters' ads at the zone level (or further as set forth below). In particular, this means that the national broadcaster and local distributor should be integrated with hardware and networking as necessary to implement the processing schemes including connecting to ad platform 1822 to handle VAST requests and responses.

Figure 19:
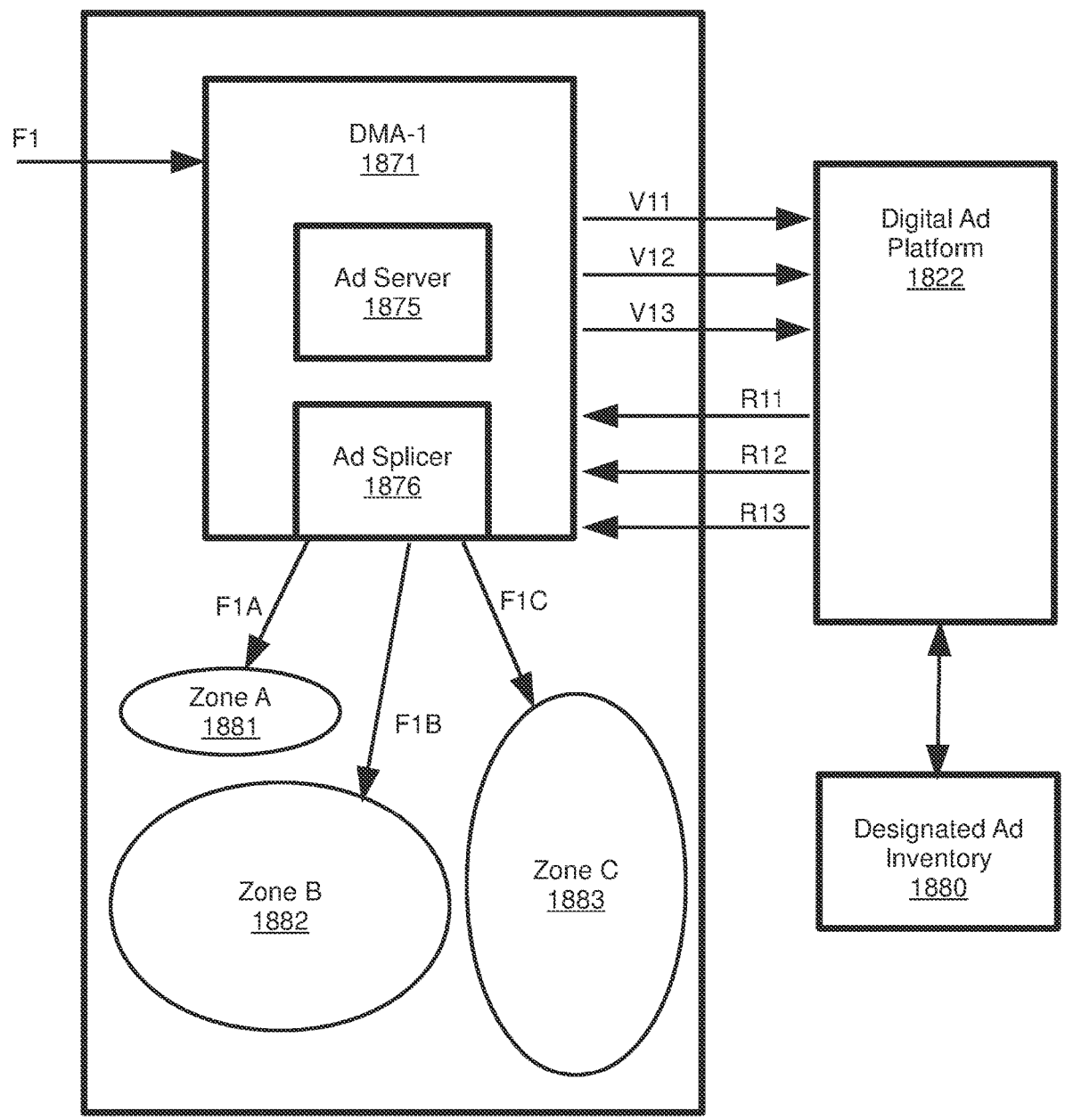
FIG. 19 is a schematic representation of an architecture for national ad preemption at the zone level.

FIG. 19 shows one example architectural arrangement, building upon FIG. 18, that illustrates three zone sublevels (there could be less or more zones) including zone A controlled through local distribution site 1871, zone B controlled through local distribution site 1882, and zone C controlled through local distribution site 1883, each zone configured within DMA-1 at independent local distributor 1871. In this scenario, upon detecting the secondary trigger signal for a national ad preemption, the local distributor 1871 initiates, as an example, three separate ad requests V11, V12 and V13 through ad server module 1875 to ad platform 1822 using the VAST protocol for three different national ads selected from available inventory and targeted at zones A, B and C, respectively. The resultant ads are retrieved and inserted by ad slicer 1876 into three newly created and modified feeds F1A, F1B and F1C, which are then distributed by local distributor 1871 to zones A, B and C through respective local distribution sites 1881, 1882, 1883.

A third scenario has the broadcaster targeting ads at the household or set top box (STB) level—but requires IP-based insertion capability at the content distribution point. This is similar to the second scenario since STBs are contained within DMAs, as illustrated in FIG. 12, and the broadcaster must again integrate and collaborate with the local cable distributor as necessary in order to have the local distribution site connect with the ad serving platform to select and serve national ads at that level. In this case, the process is streamlined since STBs are already digital and can access and play out digital content directly. Thus, upon detecting the secondary trigger signal at the local distribution site in this third scenario, the request acts to select a national ad from available ad inventory via the VAST process as set forth above. The response from ad selection provides the link to the distribution point for direct play out by the STB, addressed through the local distribution site.

The next two scenarios involve a national cable network (rather than a national broadcaster) seeking to target ad inventory at the zone level and at the STB level. These operations are similar to the second and third scenarios for national broadcasters, requiring integration and collaboration between the national cable network and local distributor in order to implement ad selection triggered by the secondary trigger signal. For example, the original linear program feed F0 is transmitted by the national cable network via uplink to satellite, and received through downlink at local cable distributors (MVPDs) serving DMAs, household and STBs within the DMAs with retransmissions of modified program feeds.

As with the national broadcaster scenarios, on the distribution side, the local cable distributors must be integrated with the national cable network in order to connect with the ad platform and serve ads into individual DMAs or STBs. For serving to the DMA level, upon detection of the secondary trigger signal, the ad server generates individual VAST requests for selecting a different national ad specifically targeted for individual DMAs, and sends the requests to the digital ad platform for ad selection. The targeting criteria and identification of available inventory is uploaded from the cable network into the ad platform for use in the ad selection routine but can also be provided within the cue message.

Upon receiving VAST responses from the ad platform, ad splicing equipment at the local cable operator uses the links provided to retrieve the selected ads from storage and insert the ads into modified program feeds for the respective DMAs.

For serving ads at the household or STB level—again requiring IP-based insertion capability at the content distribution point—the local cable distributor must integrate and collaborate with the national cable network as necessary in order connect with the ad serving platform to select and serve national ads at that level. Upon detecting the secondary trigger signal, a national ad is selected from available ad inventory and served at the STB.

Although the "downstream" distribution scenarios described above may require that the broadcast or cable network hardware/software be integrated and networked with the local cable distributor, in an alternative architectural arrangement, the national broadcaster or national cable network may install their own equipment at the local cable operator sites to enable direct access to and processing of ad selection and insertion routines via cue to VAST processing. For example, the national broadcasters and/or the national cable networks could install hardware and related ad processing routines at local cable distributors, such that the installation could interface and/or create and send its own ad requests to the ad platform upon detecting the secondary trigger rather than merely receive instructions from up the chain for that ad insertion event. Further, the local installation could, by default, include its own set of targeting parameters in an ad request upon. A local ad processing installation of the national broadcaster or national cable network equipment and software would eliminate the need for intermediate and final distributors of content to integrate and collaborate on a transactional basis with the national provider, and instead provide seamless ad insertion, even for national campaigns when so enabled.

Figure 20:
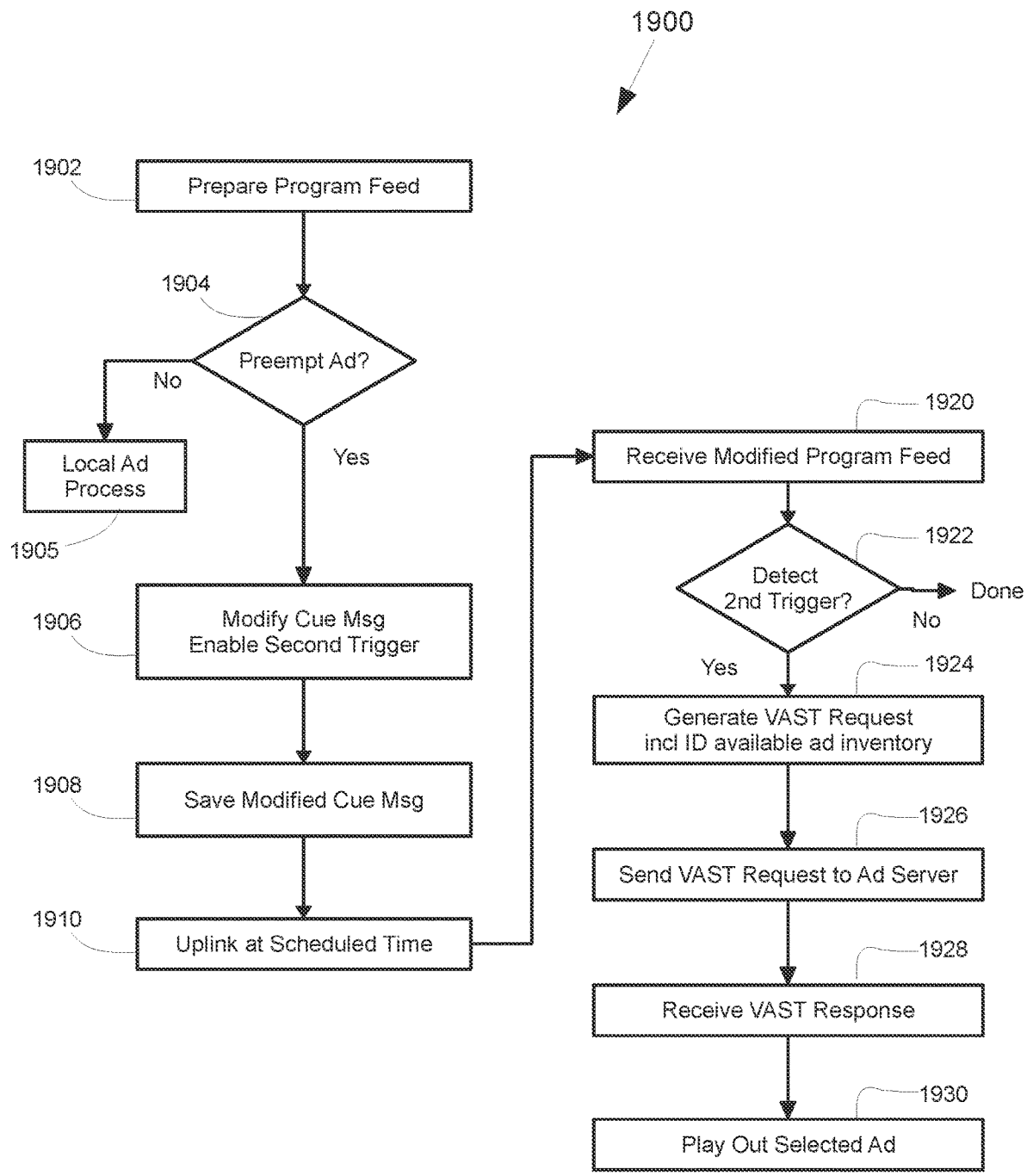
FIG. 20 is a flow chart illustrating a process for national ad preemption.

A basic method 1900 for implementing national broadcaster or national cable network preemption for national ads is illustrated in FIG. 20. In step 1902, a linear program feed for a discrete program or event is prepared and stored to include program content and ad avails. For example, in a typical one-hour program, there will be a large number of ad avails (e.g., 15 minutes) reserved for the national ad campaigns of the broadcaster or cable network and a small number of ad avails (e.g., 2-3 minutes) reserved for local ad insertions all interspersed among the program content. If the broadcaster or cable network does not wish to preempt a national ad spot in step 1904, then the program feed is not modified to enable the secondary trigger signal for national ad preemption, and the usual process, limited to insertion for local ad avails as described above, is performed in step 1905.

If preemption is chosen in step 1904, then the program feed is modified by the broadcaster or cable network in step 1906 to enable national ad preemption, for example, by enabling or insert the secondary trigger signal in the program feed, and saving the modified program feed in step 1908. In step 1910, the modified program feed is transmitted at the scheduled time by uplink to a satellite for distribution to the local affiliates or MVPDs.

Now at the local affiliate or an MVPD on the distribution side, the modified program feed is received via downlink in step 1920. If the local broadcast affiliate or local cable operator detects the secondary trigger signal in the modified program feed in step 1922, then a VAST request is generated in step 1924 to include an identification of the available ad inventory and is sent to the ad serving platform in step 1926 for decisioning and selection. If the secondary trigger signal is not detected at step 1922, no further action is taken.

In step 1928, a VAST response is received from the ad serving platform. The VAST response includes an identification of a digital ad for insertion into the specified ad avail, the ad selected from the identified inventory of national advertisements using at least the geographic targeting criteria and the program information. Once the ad is identified in the VAST response, the ad splicer at the local distribution site plays out the substitute ad selected from designated inventory in the preempted ad avail in step 1930.

The foregoing description has been presented for the purpose of illustration only—it is not intended to be exhaustive or to limit the disclosure to the precise form described. Many modifications and variations are possible in light of the above teachings.

The invention claimed is:

1. A method, comprising:
receiving a linear program feed for a scheduled time period from a national broadcaster, the linear program feed including program content, a plurality of first ad avails reserved for local ad placements and interspersed among the program content, a plurality of second ad avails reserved for national ad placements and interspersed among the program content, the plurality of second ad avails each having a national ad scheduled for play out in the linear program stream, a first trigger signal configured to identify the plurality of first ad avails, and a second trigger signal configured to identify at least one of the plurality of second ad avails for a targeted ad insertion to preempt the scheduled national ad;
detecting the second trigger signal;
upon detecting the second trigger signal, preparing and sending a VAST request to a digital ad serving platform for a first digital ad to be selected from a designated inventory of available national ads, the VAST request including targeting criteria for at least one specific geographic area and program information associated with the program content;
receiving a VAST response from the digital ad serving platform in response to the VAST request, the VAST response identifying the first digital ad; and
inserting the first digital ad into the identified at least one of the plurality of second ad avails for playout with the linear program feed.

2. The method of claim 1, wherein the specific geographic area is one of a plurality of designated marketing areas.

3. The method of claim 2, further comprising:
receiving, by a regional broadcast affiliate that distributes program content to a first one of the plurality of designated market areas, from a national broadcaster, the linear program feed;
including, by the regional broadcast affiliate, in the VAST request, targeting criteria for the first designated market area; and
distributing, by the regional broadcast affiliate, the program feed including the first digital ad to the first designated market area.

4. The method of claim 1, wherein the specific geographic area is a zone within one of a plurality of designated marketing areas.

5. The method of claim 1, further comprising:
receiving the linear program feed at a headend having equipment of the national broadcaster configured for detecting the second trigger signal, generating the VAST ad request, transmitting the VAST ad request, receiving the VAST response, and inserting the first digital ad.

6. The method of claim 1, further comprising:
receiving the linear program feed at a headend having equipment compatible with the national broadcaster and configured for detecting the second trigger signal, generating the VAST ad request, transmitting the VAST ad request, receiving the VAST response, and inserting the first digital ad.

7. A method, comprising:
receiving, by an independent cable distributor that distributes program content to at least one cable zone within a designated market area, a linear program feed for a scheduled time period from a national broadcaster, the linear program feed including program content, a plurality of ad spots reserved for national ad placements and interspersed among the program content, and a trigger signal configured to identify at least one of the plurality of ad spots for targeted preemption in the at least one cable zone;
detecting, by the cable distributor, the trigger signal in the received linear program feed identifying a first one of the plurality of ad spots for targeted preemption;
preparing and sending a VAST request to a digital ad serving platform for a first digital ad to be selected from a designated inventory of available national ads and including in the VAST request targeting criteria for the at least one cable zone; and
receiving, by the cable distributor, a VAST response in response to the VAST request identifying the first digital ad; and
inserting, by the cable distributor, for playout in the linear program feed, the first digital ad into the first one of the plurality of ad spots.

8. The method of claim 7, further comprising:
distributing the linear program feed to an independent cable distributor that distributes program content including IP-compatible content to a plurality of set top boxes within the designated market area; and
including in the VAST request, targeting criteria for the one or more of the plurality of set top boxes.

9. A method, comprising:
receiving, by a regional broadcast affiliate that distributes program content to a plurality of defined geographic zones from a national cable network, a linear program feed for a scheduled time period, the linear program feed including program content, a plurality of ad spots each reserved and scheduled for national ad placements and interspersed among the program content, and a trigger signal configured to identify a first one of the plurality of ad spots for targeted preemption;
detecting, by the regional broadcast affiliate, the trigger signal;
preparing and sending, by the regional broadcast affiliate, a VAST request to a digital ad serving platform for a first digital ad to be selected from a designated inventory of available national ads and including in the VAST request targeting criteria for at least one of the plurality of defined geographic zones;
receiving, by the regional broadcast affiliate, a VAST response identifying the first digital ad; and
distributing, by the regional broadcast affiliate to the at least one defined geographic zone, a modified linear program feed having the first digital ad inserted into the ad spot identified by the trigger signal.

10. The method of claim 9, further comprising:
receiving, by a regional broadcast affiliate that distributes program content to a plurality of set top boxes, from a national cable network, the linear program feed;
including in the VAST request targeting criteria including IP addressing information for at least one of the plurality of set top boxes; and
distributing, by the regional broadcast affiliate, a modified program feed having the first digital ad to the at least one set top box.

11. A method, comprising:
receiving a linear program feed for a scheduled time period including program content and a plurality of scheduled ad spots;
identifying at least one of the plurality of scheduled ad spots for a targeted ad insertion to preempt a previously scheduled ad;

preparing and sending a VAST request to a digital ad serving platform for a digital ad to be selected from a designated inventory of available ads, the VAST request including targeting criteria and program information associated with the program content;
receiving a VAST response from the digital ad serving platform in response to the VAST request, the VAST response identifying a selected digital ad; and
manipulating the linear program feed in order to instruct at least one video player to playout the selected digital ad in the identified ad spot.

12. A method, comprising:
receiving a manifest for a linear program feed that includes program content and a plurality of scheduled ad spots;
identifying at least one of the plurality of scheduled ad spots for a targeted ad insertion to preempt a previously scheduled ad;
preparing and sending a VAST request to a digital ad serving platform for a digital ad to be selected from a designated inventory of available ads, the VAST request including targeting criteria and program information associated with the program content;
receiving a VAST response from the digital ad serving platform in response to the VAST request, the VAST response identifying a selected digital ad; and
manipulating the manifest to identify the selected digital ad for playout during the identified ad spot.

* * * * *